US011106708B2

(12) United States Patent
Lu et al.

(10) Patent No.: US 11,106,708 B2
(45) Date of Patent: Aug. 31, 2021

(54) LAYERED LOCALITY SENSITIVE HASHING (LSH) PARTITION INDEXING FOR BIG DATA APPLICATIONS

(71) Applicants: Yangdi Lu, Thornhill (CA); Wenbo He, Oakville (CA); Amirhosein Nabatchian, Maple (CA)

(72) Inventors: Yangdi Lu, Thornhill (CA); Wenbo He, Oakville (CA); Amirhosein Nabatchian, Maple (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 204 days.

(21) Appl. No.: 16/044,362

(22) Filed: Jul. 24, 2018

(65) Prior Publication Data
US 2019/0272341 A1    Sep. 5, 2019

Related U.S. Application Data

(60) Provisional application No. 62/637,278, filed on Mar. 1, 2018.

(51) Int. Cl.
*G06F 16/31* (2019.01)
*G06F 16/33* (2019.01)

(52) U.S. Cl.
CPC ........ *G06F 16/325* (2019.01); *G06F 16/3347* (2019.01)

(58) Field of Classification Search
CPC ...... G06F 16/137; G06F 16/152; G06F 16/31; G06F 16/325; G06F 16/3347;
(Continued)

(56) References Cited

U.S. PATENT DOCUMENTS 6,745,205 B2    6/2004  Choi et al.
8,165,414 B1 *  4/2012  Yagnik .............. G06F 16/41
                                                382/255
(Continued)

FOREIGN PATENT DOCUMENTS

CN      104035949 B     5/2017
WO      2017011768 A1   1/2017

OTHER PUBLICATIONS

Ji et al.,"Batch-Orthogonal Locality-Sensitive Hashing for Angular Similarity," in IEEE Transactions on Pattern Analysis and Machine Intelligence, vol. 36, No. 10, pp. 1963-1974, Oct. 1, 2014 (Year: 2014).*

(Continued)

*Primary Examiner* — Tamara T Kyle
*Assistant Examiner* — Lana Alagic

(57) ABSTRACT

System and method of partitioning a plurality of data objects that are each represented by a respective high dimensional feature vector is described, including performing a hashing function on each high dimensional feature vector to generate a respective lower dimensional binary compact feature vector for the data object that is represented by the high dimensional feature vector; performing a further hashing function on each compact feature vector to assign a sub-index ID to the compact feature vector; and partitioning the compact feature vectors into respective partition groups that correspond to the sub-index IDs assigned to the compact feature vectors.

14 Claims, 14 Drawing Sheets

(58) Field of Classification Search
CPC .......... G06F 16/41; G06F 16/51; G06F 16/53; G06F 16/583; G06F 16/61; G06F 16/63; G06F 16/683; G06F 16/71; G06F 16/73; G06F 16/783; G06F 16/902; G06F 16/9014; G06F 16/908; G06F 16/951; G06F 16/285; G06N 20/00

See application file for complete search history.

(56) References Cited

U.S. PATENT DOCUMENTS

| | | | | |
|---|---|---|---|---|
| 8,224,849 | B2* | 7/2012 | Li | G06K 9/4642 707/780 |
| 2003/0120630 | A1* | 6/2003 | Tunkelang | G06F 16/2455 |
| 2006/0101060 | A1* | 5/2006 | Li | G06F 16/583 |
| 2013/0204905 | A1* | 8/2013 | Ioffe | H04L 9/00 707/803 |
| 2017/0046382 | A1* | 2/2017 | Li | G06F 16/2264 |
| 2017/0139913 | A1* | 5/2017 | Hsiao | G06F 16/2255 |

OTHER PUBLICATIONS

Abdelsadek, Ahmed. "Distributed index for matching multimedia objects." Simon Fraser University (2014). (Year: 2014).*

Bahmani, Bahman, Ashish Goel, and Rajendra Shinde. "Efficient distributed locality sensitive hashing." Proceedings of the 21st ACM international conference on Information and knowledge management. 2012. (Year: 2012).*

A. Andoni et al., "Practical and Optimal LSH for Angular Distance", Advances in Neural Information Processing Systems, pp. 1225-1233, 2015.

B. Bahmani et al., "Efficient Distributed Locality Sensitive Hashing", Proceedings of CIKM 2012.

M. Bawa et al, "LSH Forest: Self-Tuning Indexes for Similarity Search", Proceedings of the 14th International Conference on World Wide Web, pp. 651-660, ACM, 2005.

N. Beckmann et al., "The R* -tree: An Efficient and Robust Access Method for Points and Rectangles", Acm Sigmod Record, vol. 19, pp. 322-331, ACM, 1990.

A. Beygelzimer et al., Cover Trees for Nearest Neighbor, Proceedings of the 23rd International Conference on Machine Learning, pp. 97-1104, ACM, 2006.

K. L. Clarkson et al., "Nearest-Neighbor Searching and Metric Space Dimensions", Nearest-Neighbor Methods for Learning and Vision: Theory and Practice, pp. 15-59, 2006.

S. Cost et al., "A Weighted Nearest Neighbor Algorithm for Learning with Symbolic Features", Machine Learning, 10(1):57-78, 1993.

T. Cover et al., "Nearest neighbor pattern classification", IEEE Transactions on Information Theory, vol. 13, No. 1, pp. 21-27, 1967.

M. Datar et al., "Locality-Sensitive Hashing Scheme Based on p-Stable Distributions", Proceedings of SCG, 2004.

P. Dhar, "A Study of Big Data Analytics & Tools: Challenges and Disadvantages", International Journal of Innovations & Advancement in Computer Sciences, 2017.

C. Fu et al., "Fast Approximate Nearest Neighbor Search with the Navigating Spreading-Out Graph", arXiv preprint arXiv:1707.00143, 2017.

E. C. Gonzalez et al., "Effective Proximity Retrieval by Ordering Permutations", IEEE Transactions on Pattern Analysis and Machine Intelligence, 30(9):1647-1658, 2008.

A. Guttman et al., R-Trees: A Dynamic Index Structure for Spatial Searching, vol. 14., ACM, 1984.

P. Indyk et al., "Approximate Nearest Neighbors: Towards Removing the Curse of Dimensionality", Proceedings of the Thirtieth Annual ACM Symposium on Theory of Computing, STOC 1998, pp. 604-613, New York, NY, USA, 1998, ACM.

J. Ji et al., "Batch-Orthogonal Locality-Sensitive Hashing for Angular Similarity,"IEEE Transactions on Pattern Analysis and Machine Intelligence, 36(10):1963-1974, 2014.

A. Joly et al., "A Posteriori Multi-Probe Locality Sensitive Hashing", Proceedings of the 16th ACM International Conference on Multimedia, MM 2008, pp. 209-218, New York, NY, USA, 2008, ACM.

A. Khwileh et al., "Utilisation of Metadata Fields and Query Expansion in Cross-Lingual Search of User-Generated Internet Video", Journal of Artificial Intelligence Research, 55:249-281, 2016.

E. Kushilevitz et al., "Efficient Search for Approximate Nearest Neighbor in High Dimensional Spaces", SIAM Journal on Computing, 30(2):457-474, 2000.

Y. Liu et al., "SK-LSH: An Efficient Index Structure for Approximate Nearest Neighbor Search", Proc. VLDB Endow., 7(9):745-756, May 2014.

D. G. Lowe, "Distinctive Image Features from Scale-Invariant Keypoints" International Journal of Computer Vision, 60(2):91-110, 2004.

Q. Lv et al., "Multi-Probe LSH: Efficient Indexing for High-Dimensional Similarity Search", Proceedings of VLDB 2007.

Y. Malkov et al., "Approximate nearest neighbor algorithm based on navigable small world graphs", Information Systems, 45:61-68, 2014.

Y. A. Malkov et al., "Efficient and Robust Approximate Nearest Neighbor Search Using Hierarchical Navigable Small World Graphs", arXiv preprint arXiv:1603.09320, 2016.

B. Naidan et al., "Permutation Search Methods are Efficient, Yet Faster Search is Possible", Proceedings of the VLDB Endowment, 8(12):1618-1629, 2015.

J. Pan et al., "Fast GPU-based Locality Sensitive Hashing for K-Nearest Neighbor Computation", Proceedings of GIS 2011, ACM.

J. Pennington et al., "GloVe: Global Vectors for Word Representation", Empirical Methods in Natural Language Processing (EMNLP), pp. 1532-1543, 2014.

J. T. Robinson, "The K-D-B-Tree: A Search Structure for Large Multidimensional Dynamic Indexes", Proceedings of the 1981 ACM SIGMOD International Conference on Management of Data, pp. 10-18. ACM, 1981.

O. Russakovsky et al., "ImageNet Large Scale Visual Recognition Challenge", International Journal of Computer Vision (IJCV), 115(3):211-252, 2015.

B. Sarwar et al., "Item-Based Collaborative Filtering Recommendation Algorithms", Proceedings of the 10th International Conference on World Wide Web, pp. 285-295, ACM, 2001.

P. Scovanner et al., "A 3-Dimensional Sift Descriptor and its Application to Action Recognition, "In Proceedings of the 15th ACM International Conference on Multimedia, pp. 357-360, ACM, 2007.

T. Sellis et al., The R+-Tree: A Dynamic Index for Multi-Dimensional Objects. Technical Report, 1987.

N. Sundaram et al., "Streaming Similarity Search Over One Billion Tweets Using Parallel Locality-Sensitive Hashing", Proc. VLDB Endow., 6(14):1930-1941, Sep. 2013.

Y. Tao et al., "Quality and Efficiency in High Dimensional Nearest Neighbor Search". Proceedings of SIGMOD, 2009.

R. Weber et al, A Quantitative Analysis and Performance Study for Similarity-Search Methods in High-Dimensional Spaces, VLDB, vol. 98, pp. 194-205, 1998.

X. Wu et al., "Practical Elimination of Near-Duplicates from Web Video Search", Proceedings of the 15th ACM International Conference on Multimedia, pp. 218-227, ACM, 2007.

N. Zhu et al., "A Content-Based Indexing Scheme for Large-Scale Unstructured Data", 2017 IEEE Third International Conference on Multimedia Big Data (BigMM), pp. 205-212, 2017.

* cited by examiner

Algorithm 1: Orthogonal Angle Hash Functions Generation

Input: Data point dimension $d$; Hash Family Size $F_S$; Number of hash functions $m$

Output: One orthogonal angle Hash functions $G$

1   $O = 0$ /*Save the Orthogonal angle Hash family*/;
2   $G = 0$;
3   Generate a random matrix $H$ with each element $x$ being sampled independently from the normal distribution $\mathcal{N}(0, 1)$. Denote $H = [x_{i,j}]_{F_S \times d}$;
4   Compute the $QR$ decomposition of $H$, such that $H = QR$;
5   for $i = 1; i < F_S$ do
6      $o$ = the first $d$ items in $i$-th column of $Q$;
7      $O = O \cup o$
8   for $i = 1; i < m$ do
9      $nextID$ = choose a random number from 1 to $F_S$;
10     $G = G \cup O(nextID)$
11   return $G$;

FIG. 3

Algorithm 2: Hash Value Generation

Input: LSHTables $G_i = (h_1, h_2, ..., h_m)$; Raw feature as SparseVector $V_j$, which is a four componenets tuple: $(objectID, dimension, listOfIndex, listOfValues)$;

Output: Hash value matrix $E$

1  $E = zeros(n, L)$;
2  for $j = 1; j \leq n$ do
3      for $i = 1; i \leq L$ do
4          integer $e = 0, curBit = 0$;
5          for $w = 1; w \leq m$ do
6              compute $curBit = sign(V_j.listOfValues \cdot G_i.h_w)$;
7              compute $e = e << 1 \mid curBit$;
8          $E[j, i] = e$;
9  return $E$;

FIG. 4

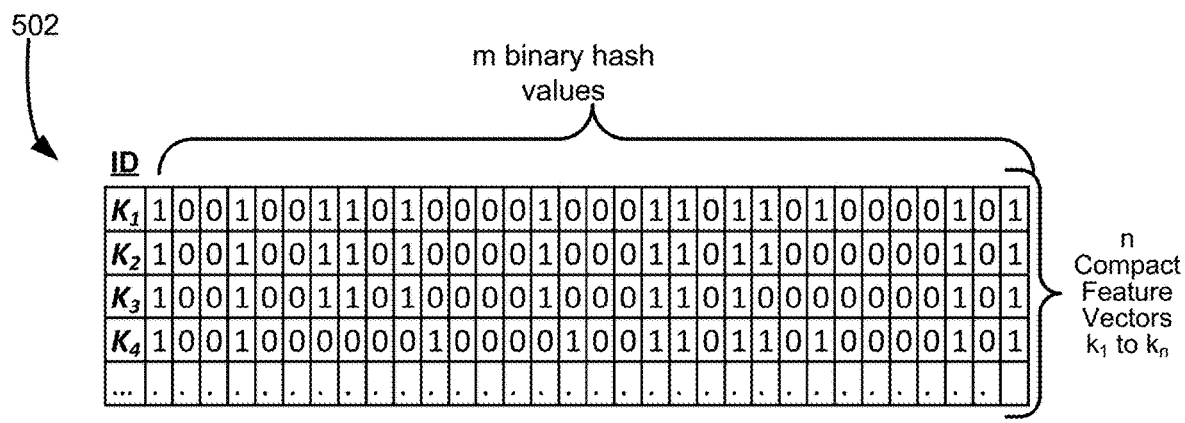

FIG. 5

Algorithm 3: Layered LSH Partition Strategy

Input: Partition layer LSH $G' = (h_1, h_2, ..., h_M)$; Hash value matrix $E[j, i]$ after applying the first layer LSH;

Output: sub-index-ID $subID$ 1 integer $subID = 0$, $curBit = 0$;
2 integer Array $hashValue = zeros(m)$;
3 for $x = 0; x < m$ do
4      compute
         $hashValue(x) = (E[j, i] \ \& \ (1 << x)) >>> x$;

5 for $x = 1; x \leq M$ do
6      compute $curBit = sign(hashValue \cdot G'.h_x)$;
7      compute $subID = subID << 1 \ | \ curBit$;

8 return $subID$;

FIG. 13

LAYERED LOCALITY SENSITIVE HASHING (LSH) PARTITION INDEXING FOR BIG DATA APPLICATIONS

RELATED APPLICATIONS

This application claims benefit of and priority to U.S. Provisional Patent Application No. 62/637,278 filed Mar. 1, 2018, the contents of which are incorporated herein by reference.

FIELD

The present disclosure relates to generally to indexing and searching of databases, and in particular, to partition indexing of unstructured data.

BACKGROUND

The volume of unstructured multimedia data objects, including for example image data, video data, audio data, text data and other sophisticated digital objects, that is stored in digital information repositories such as online Internet and cloud-based databases is growing dramatically. Processing search queries for unstructured data in an accurate and resource efficient manner presents technical challenges.

Similarity searching is a type of data searching in which unstructured data objects are searched based on a comparison of similarities between a query object and the data objects in a search database. Similarity searching typically involves creating metadata for each of the data objects stored in a database, creating metadata for a query object and then comparing the metadata for the query object with the metadata of the data objects. The metadata for each object can take the form of a feature vector, which is a multi-dimensional vector of numerical features that represent the object. In this regard, similarity searching can be defined as finding a feature vector from among multiple feature vectors stored in a database that is most similar to a given feature vector (e.g. query vector). Similarity search algorithms can be used in pattern recognition and classification, recommendation systems, statistical machine learning and many other areas.

Thus, a similarly search generally involves translating (converting) a query object (e.g. an image, video sample, audio sample or text) into a query feature vector which is representative of the query object, using a feature extraction algorithm. The query feature vector is then used for searching a database of feature vectors to locate one or more data object feature vectors (e.g. a feature vector for a data object stored in the database) that are most similar to the query feature vector.

In the context of unstructured data objects, the feature vectors are often high-dimensional vectors. In a high dimensional feature space, data for a given dataset becomes sparse, so distances and similarities lose statistical significance, with the result that query performance declines exponentially with an increasing number of dimensions. This is referred to as the "Curse of Dimensionality" problem.

One method to address the "Curse of Dimensionality" problem includes applying a dimensionality reduction algorithm to each feature vector stored in the database to generate a shorter version of each feature vector (e.g. a compact feature vector). After generating a compact feature vector for each feature vector for each object stored in the database, a search index is generated from the compact feature vectors using an index generation algorithm. The dimensionality reduction algorithm is also applied to the query feature vector to generate a shorter version of the query feature vector (e.g. compact query feature vector). A similarity search can then be performed by providing the compact query vector and the search index to a search algorithm to find candidate data object feature vectors that are most similar to the query feature vector.

One method for converting a feature vector having a large number of vector dimensions into a compact feature vector with a reduced number of vector dimensions and generating a corresponding search index is to apply hashing-based approximate nearest neighbor (ANN) algorithms. For example, locality sensitive hashing (LSH) can be used to reduce the dimensionality of high-dimensional data. LSH hashes input items so that similar items map to the same "buckets" with high probability (the number of buckets being much smaller than the universe of possible input items). In particular, a feature vector can be hashed using an LSH algorithm to produce a LSH hash value that functions as the compact feature vector.

However, a problem with existing LSH-ANN based indexing and search algorithms is that they can result in search queries that are overly biased towards similarities between the most significant bits (MSB) of the compact feature vectors. In particular, existing index generation methods may use the first several bits (or other groups of consecutive bits such as the final several bits) of compact feature vectors to identify similar feature vectors. However, these bits may be a poor indicator of similarity, resulting in inaccurate searching and inefficient use of computing resources.

An example of this MSB problem is illustrated in FIG. 1A, which shows an example of an LSH-based index and search method 100. In the example of FIG. 1A, an index 102 points to different slots or buckets 104(1), 104(2) that each include respective set of hash values in the form of compact feature vectors $K_i$. The compact feature vectors $K_i$ are grouped in respective buckets 104(1), 104(2) based on a longest length of common prefix (LLCP) or other defined distance measurement approach. As depicted in FIG. 1A, the compact feature vector $K_1$ is more similar to compact feature vector $K_2$ than to compact feature vector $K_3$ based on Euclidian distance. However, based on a comparison of the first two (2) components (for example the first 2 bits) of the compact feature vector $K_1$ to compact feature vectors $K_2$ and $K_3$, the index generation method of FIG. 1 divides the compact feature vectors $K_1$ and $K_2$ into different buckets 104(1) and 104(2), and combines compact feature vectors $K_1$ and $K_3$ into the same bucket 104(2). When a compact query feature vector q comes in, based on the first two components, the compact query feature vector q would be more close to the first bucket 104(1) and hence compact feature vectors $K_1$ and $K_3$ are returned as candidate nearest neighbors, where ideally compact feature vectors K1 and K2 should be returned as the nearest neighbors to compact query feature vectors q. This error results from the fact that the left components or bits are granted priority in partitioning although there was no preference for the components or bits when selecting the hash functions. This affects the accuracy when using the generated search index for similarity searching.

In environments that have multiple search queries to search large volumes of unstructured data objects stored in digital information repositories, concurrent search queries partition strategies can be used to divide data indexes into groups. For example, in order to facilitate searching, indexes can be partitioned or divided into partition groups (which can include slots or buckets) with purportedly similar objects being assigned to the same partition group. Similar to the MSB problem described above, existing partition methods use a fixed number of leading bits in a compact feature vector to partition the compact feature vectors into partition groups. When a query is performed, the search is conducted only in respect of one partition group, which can yield a large error. FIG. 1B shows an example of a conventional (not content-based) partition method. Based on their leading 2 bits, the compact feature vectors $K_2$ and $K_3$ are placed in partition group 11, and the compact feature vectors $K_1$ and $K_4$ are in placed in partition group 01. Although the hash values $K_1$ and $K_2$ are almost identical except for their first bits, the conventional partitioning method places the hash values $K_1$ and $K_2$ into different partition groups. Also, conventional partitioning method places the extremely different hash values $K_2$ and $K_3$ into the same partition group. Accordingly, similar compact feature vectors are likely to be placed into different sub-indexes (e.g. partition groups), which affects the accuracy and consistency of similarity searching.

Accordingly, methods and systems are disclosed herein that address the aforementioned partitioning problem to improve the accuracy and efficiency of searching large scale unstructured data stored in digital information repositories, including systems and methods that can improve computational efficiency when searching and searching accuracy.

SUMMARY

Illustrative embodiments are disclosed by way of example in the description and claims. According to one example aspect is a system and method of generating an index structure for indexing a plurality of unstructured data objects, comprising: generating a set of compact feature vectors, the set including a compact feature vector for each of the data objects, the compact feature vector for each data object including a sequence of hashed values that represent the data object; and indexing the compact feature vectors into partition groups based on content of the compact feature vector.

According to a first example aspect, a method of partitioning a plurality of data objects that are each represented by a respective high dimensional feature vector is described. The method includes performing a hashing function on each high dimensional feature vector to generate a respective lower dimensional binary compact feature vector for the data object that is represented by the high dimensional feature vector; performing a further hashing function on each compact feature vector to assign a sub-index ID to the compact feature vector; and partitioning the compact feature vectors into respective partition groups that correspond to the sub-index IDs assigned to the compact feature vectors.

In some example embodiments, the hashing function performed on each high dimensional feature vector is a locality sensitive hashing (LSH) function, and the further hashing function performed on each compact feature vector is also an LSH function. In some examples, the hashing function and the further hashing function are orthogonal angle hashing functions. In some examples the method includes generating a searchable sub-index structure for each of the respective partition groups.

In some examples, each compact feature vector is partitioned into only a single one of the partition groups. In some examples, the sub-index structures are stored as independently searchable structures enabling the sub-index structures to be searched concurrently with each other.

In some example embodiments, generating a searchable sub-index structure for each of the respective partition groups comprises, for each partition group: generating a plurality of twisted compact feature vector sets for the compact feature vectors of the partition group, each of the twisted compact feature vector sets being generated by applying a respective random shuffling permutation to the compact feature vectors of the partition group; for each twisted compact feature vector set, generating an index table for the data objects represented by the compact feature vectors of the partition group based on sequences of the hashed values in the twisted compact feature vector set; and including the index tables generated for each of the twisted compact feature vector sets in the searchable sub-index structure for the partition group.

According to a second example aspect, a system for partitioning data objects that are each represented by a respective high dimensional feature vector is described. The system includes one or more processing units and a system storage device coupled to the processor system. The system storage device stores executable instructions that, when executed by the one or more processing units, cause the system to: perform a hashing function on each high dimensional feature vector to generate a respective lower dimensional binary compact feature vector for the data object that is represented by the high dimensional feature vector; perform a further hashing function on each compact feature vector to assign a sub-index ID to the compact feature vector; and partition the compact feature vectors into respective partition groups that correspond to the sub-index IDs assigned to the compact feature vectors.

According to a third example aspect is a computer program product comprising a medium tangibly storing thereon executable instructions that, when executed by a digital processing system, cause the digital processing system to: perform a hashing function on each of a plurality of high dimensional feature vectors to generate respective lower dimensional binary compact feature vectors, the high dimensional feature vectors each representing a respective data object; perform a further hashing function on each compact feature vector to assign a sub-index ID to the compact feature vector; and partition the compact feature vectors into respective partition groups that correspond to the sub-index IDs assigned to the compact feature vectors.

According to a fourth example aspect is a method of searching for data objects that are similar to a query object. The method includes: converting the query object into a d-dimensional feature vector; performing a hashing function on the d-dimensional feature vector to generate an m-dimensional binary compact query vector for the query object, where m<d; performing a further hashing function on the query vector to determine a sub-index ID for the query vector; and searching, in a sub-index structure that corresponds to the sub-index ID, for compact feature vectors that are similar to the query vector, the sub-index structure comprising an index of compact feature vectors that each represent a respective data object.

In example embodiments of the fourth aspect, the hashing function performed on the d-dimensional feature vector is a locality sensitive hashing (LSH) function, and the further hashing function performed on the compact feature query vector is also an LSH function. In some examples, the hashing function and the further hashing function are orthogonal angle hashing functions.

In example embodiments of the fourth aspect, the method includes: determining a set of further sub-index IDs that fall within a similarity threshold for the sub-index ID for the query vector; and searching further sub-index structures that correspond to the further sub-index IDs for compact feature vectors that are similar to the query vector In some examples, the similarity threshold is a threshold level of different bit values in the further sub-index IDs relative to the sub-index ID of the query vector.

In some example embodiments of the fourth aspect, the searching of further sub-index structures is terminated if a threshold number of search results is reached before all of the sub-index structures that correspond to the further sub-index IDs have been searched.

In some example embodiments of the fourth aspect, the method includes, concurrent with searching in a sub-index structure that corresponds to the sub-index ID: searching a further sub-index structure for compact feature vectors that are similar to a further query vector for which a further sub-index ID has been determined.

According to a fifth example aspect, a system for searching for data objects that are similar to a query object is described. The system includes: one or more processing units; and a system storage device coupled to each of the one or more processing units. The system storage device tangibly stores executable instructions that, when executed by the one or more processing units, cause the system to: convert the query object into a d-dimensional feature vector; perform a hashing function on the d-dimensional feature vector to generate an m-dimensional binary compact query vector for the query object, where m<d; perform a further hashing function on the query vector to determine a sub-index ID for the query vector; and search, in a sub-index structure that corresponds to the sub-index ID, for compact feature vectors that are similar to the query vector, the sub-index structure comprising an index of compact feature vectors that each represent a respective data object.

According to a sixth example embodiments is a computer program product comprising a medium tangibly storing thereon executable instructions that, when executed by a digital processing system, cause the digital processing system to search for data objects that are similar to query object by: converting the query object into a d-dimensional feature vector; performing a hashing function on the d-dimensional feature vector to generate an m-dimensional binary compact query vector for the query object, where m<d; performing a further hashing function on the query vector to determine a sub-index ID for the query vector; and searching, in a sub-index structure that corresponds to the sub-index ID, for compact feature vectors that are similar to the query vector, the sub-index structure comprising an index of compact feature vectors that each represent a respective data object.

BRIEF DESCRIPTION OF THE DRAWINGS

Examples of embodiments of the invention will now be described in greater detail with reference to the accompanying drawings.

FIG. 3 is a pseudo-code representation of a method for generating hash value functions according to example embodiments.

FIG. 4 is a pseudo-code representation of a method for generating compact feature vectors based on the functions generated by the method of FIG. 3.

FIG. 5 illustrates a first layer LSH hash value table according to an example embodiment.

FIG. 13 is a pseudo-code representation of the portioning method of FIG. 11B for assigning sub-index IDs to compact feature vectors.

DETAILED DESCRIPTION

Figure 1A:
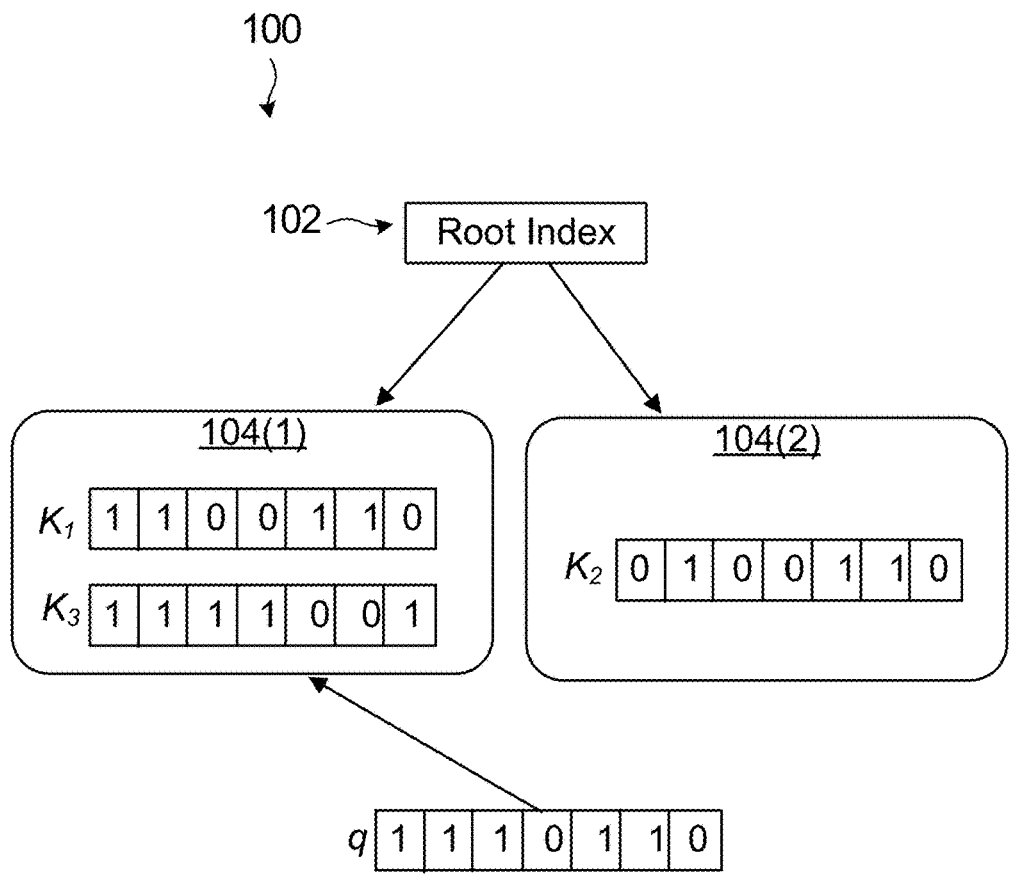
FIG. 1A is a diagram showing an example of a prior art locality sensitive hashing (LSH) based index and search method.
Figure 1B:
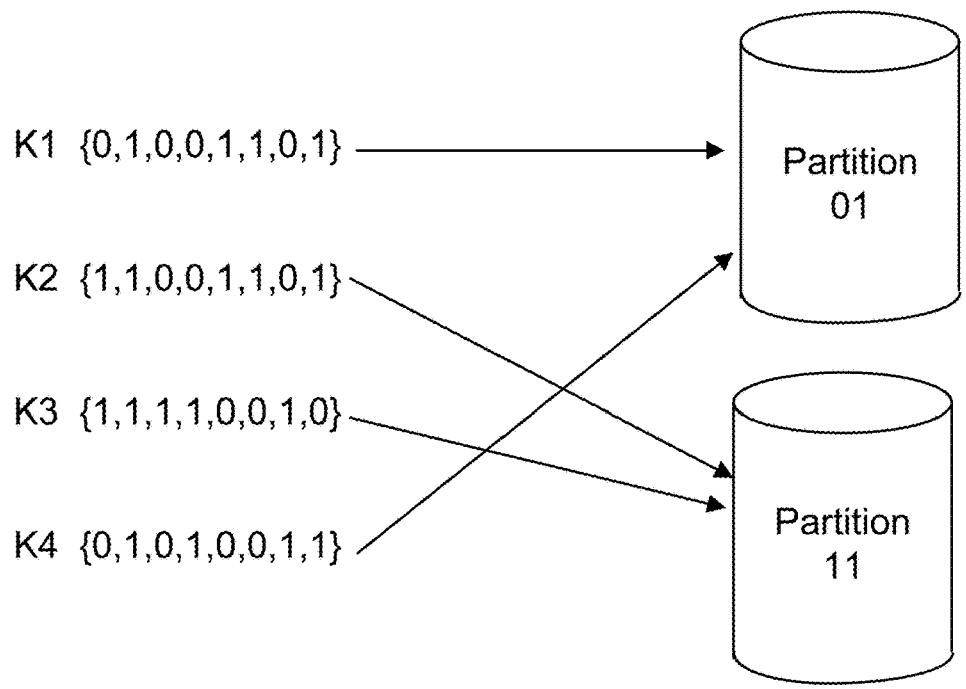
FIG. 1B is a diagram showing an example of a prior art partitioning method.
Figure 2:
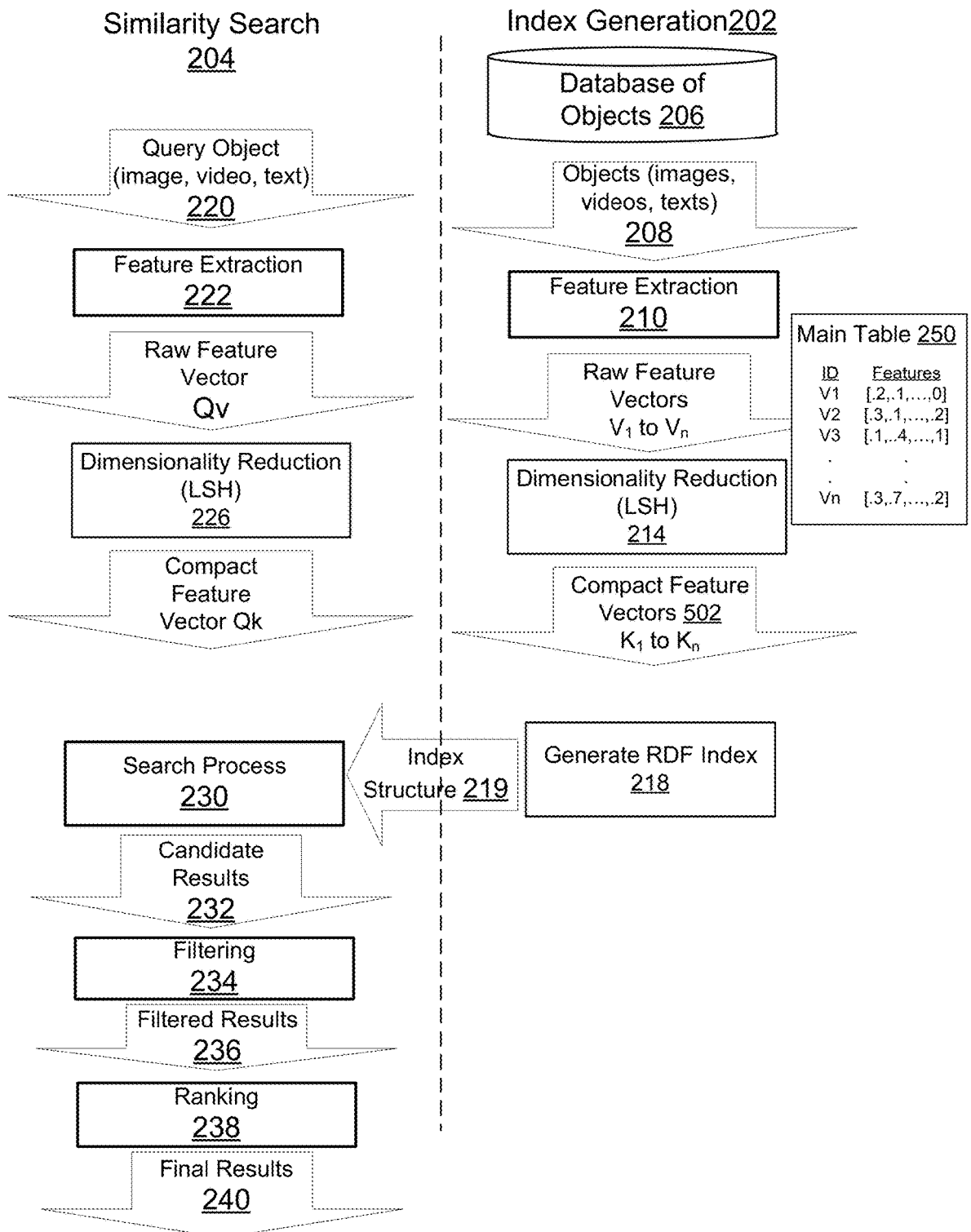
FIG. 2 is a flow diagram illustrating index generation and similarity search methods according to example embodiments.

FIG. 2 is a flow diagram illustrating index generation and similarity search methods 202, 204 according to example embodiments. In example embodiments index generation method 202 and similarity search method 204 are performed by software implemented on one or more digital processing systems. In example embodiments, the index generation method 202 and similarity search method 204 enable their host digital processing system(s) to function in a more efficient and accurate manner. For example, the methods and systems described herein may in some applications use less processing resources and to deliver search results of similar or better accuracy than previously available similarity search methodologies.

As illustrated in FIG. 2, in example embodiments the index generation method 202 is periodically performed to index unstructured data objects 208 that are stored in an object database 206. For example, index generation method 202 could be performed when a threshold level of changes occurs in the object database 206 through the addition, modification or deletion of objects 208 stored in the object database 206. Additionally, or alternatively, index generation method 202 could be performed based on a predefined schedule, for example hourly or daily or weekly. In example embodiments, similarity search 204 is performed when a query object is received. In some example embodiments, object database 206 may be a distributed database that includes complex data objects 208 stored across multiple digital repositories that are hosted on different real or virtual machines at one or more locations.

Index generation method 202, which generates an index structure 219 for n objects 208 stored in object database 206, will now be described in greater detail according to example embodiments. Index generation method 202 begins with a feature extraction process 210 during which information is extracted from the unstructured data objects 208 that are included in database 206 to produce a corresponding raw feature vector $v_i$ for each one of the n data objects 208. The unstructured data objects 208 that are included in database 206 may for example be one of video data objects, audio data objects, image data objects, text data objects, and other unstructured data objects. For example, image objects 208 may each be represented by a respective raw feature vector $v_i$ derived from a color histogram of the raw image data, and video objects 208 may each be represented by a respective raw feature vector $v_i$ derived from a scale-invariant feature transform (SIFT) or 3D-SIFT of the raw video data or from discriminate video descriptors (DVD). A number of different feature vector formats are known for representing different classes of data objects, and any of these formats are suitable for feature extraction process 210 to convert data objects 208 into respective raw feature vectors $v_1$ to $v_n$. In the example of FIG. 2, the raw feature vectors $V_1$ to $V_n$ (for a total of n data objects) are stored in a main table 250. In main table 250, each raw feature vector $V_1$ to $V_n$ is stored as an objectID and a corresponding d-dimensional feature list that includes d normalized feature values $fv_1$ to $fv_d$ (e.g. $Vj=\{fv_1, fv_2, \ldots fv_d\}$, where each feature value $fv_1$ to $fv_d$ is normalized between 0 and 1. The objectID can directly or indirectly point to the storage locations in the object database where the unstructured data objects 208 that the raw feature vectors $V_1$ to $V_n$ represent are stored.

A dimensionality reduction process 214 is then performed on each of the raw feature vectors $V_1$ to $V_n$ to convert the high-dimensional raw feature vectors to respective low-dimensional compact feature vectors $K_1$ to $K_n$. Although different reduction algorithms are possible, in at least one example embodiment, dimensionality reduction process 214 applies a locality sensitivity hashing (LSH) algorithm that uses orthogonal angle hash functions to convert d-dimensional raw feature vectors $V_1$ to $V_n$ to respective m-dimensional compact feature vectors $K_1$ to $K_n$. In this regard, FIG. 3 shows a pseudo-code representation of an algorithm for generating the orthogonal angle hash functions that are then applied during dimensionality reduction process 214 to convert raw feature vectors to respective compact feature vectors. The algorithm of FIG. 3 may be performed as a configuration step prior to index generation process 202 and the resulting hash functions stored as LSH function tables for future use.

The algorithm of FIG. 3 is provided with predefined inputs that include: the number (d) of dimensions of the raw feature vector $V_{ji}$ that the hash functions will be applied to (data point dimension=d); the number (m) of hash functions that will be included in each orthogonal angle hash function chain $G_i$; and the total hash family size $F_s$ (e.g. the total number of hash functions that the m hash functions are chosen from). The output of the algorithm of FIG. 3 is a set of L orthogonal angle hash function chains $G_i$, where i=1 to L. Each orthogonal angle hash function chain $G_i$ includes m hash functions $h_j$ (denoted as $G_i=(h_1, h_2, \ldots, h_m)$ where $h_1, h_2, \ldots, h_m$ are randomly picked hash functions from the family of $F_s$ hash functions). As represented in FIG. 3, a random L by d matrix H is generated, with the elements x of matrix H sampled independently from the normal distribution. A QR decomposition of matrix H is then performed (where H=QR, and assuming $d \le F_s$) to determine the orthogonal matrix Q. After QR decomposition, each column in the resulting m by L matrix Q provides an orthogonal vector (namely an orthogonal angle hash function chain $G_i$) of m elements. Accordingly, each column in the matrix Q provides a respective orthogonal angle hash function chain $G_i$ (also referred to as an LSH table) that includes m hash functions $h_j$, where $1 \le j \le m$ ($G_i=(h_1, h_2, \ldots, h_m)$). FIG. 3 provides one example of a suitable hash function generation algorithm, and in other example embodiments different known hash generation algorithms could be used in place of the algorithm of FIG. 3 to generate suitable compound LSH function chains for use in the index generation and searching processes described herein.

Once the orthogonal angle hash function chains $G_i$ are generated, the hash functions are available for use in dimensionality reduction process 214 to reduce each d-dimension raw feature vector $Vj_i$ to a respective m-dimension compact feature vector $K_j$. In this regard, FIG. 4 shows a pseudo-code representation of an algorithm for generating hash value matrix E of compact feature vectors $K_1$ to $K_n$.

In example embodiments, the feature vector values stored in main table 250 for each of the raw feature vectors $V_1$ to $V_n$ are already normalized. For each of the feature vector values, the inner product between the hash function and the feature vector value is directly calculated. The result is the cos(hash function, feature vector value), which is called the angular distance. To determine which hyper plane the feature vector value lies in, a sign( ) operation is applied to the result, providing an output for each hash function on a feature vector value of −1 or 1. To simplify digital storage, a hash value of −1 is treated as a 0. The algorithm shown in FIG. 4 is an example of one suitable hashing algorithm for obtaining compound hash values, and other orthogonal hashing algorithms that reduce d-dimensional vectors to m-sized vectors may be used in other example embodiments.

Accordingly, dimensionality reduction process 216 applied LSH to reduce each d-length raw feature vector to an m-length binary sequence, as represented by the compact feature value $K_j=G_i(V_j)=\{h_1(V_j),h_2(V_j), \ldots, h_m(V_j)\}$ Each binary value in the binary sequence of the compact feature value $K_j$ is the hash function result of all the feature values $fv_1$ to $fv_d$ of a feature vector $V_j$ with a respective one of the m hash functions ($h_1, h_2, \ldots, h_m$) of hash function chain Gi. For example, the first binary value in compact featire vector $K_j$ is the hash of hash function $h_1$ with the feature values of $fv_1$ to $fv_d$ of raw feature vector M. FIG. 5 shows the resulting compact feature vector set 502, which is shown as a table of hash values in which each row represents a respective compact feature vector $K_j$. Each compact feature vector has a respective identifier (ID) $K_j$, where $1 \le j \le n$, and a sequence of m binary values. In FIG. 5, m=32. In example embodiments, the ID $K_j$ is a memory pointer that points to a list of the m binary hash values that make up compact feature vector 216. In example embodiments, each compact feature vector $K_i$ is associated with or includes a pointer (for example objectID) that points to the raw feature vector $V_i$ that the compact feature vector $K_i$ represents.

Figure 6:
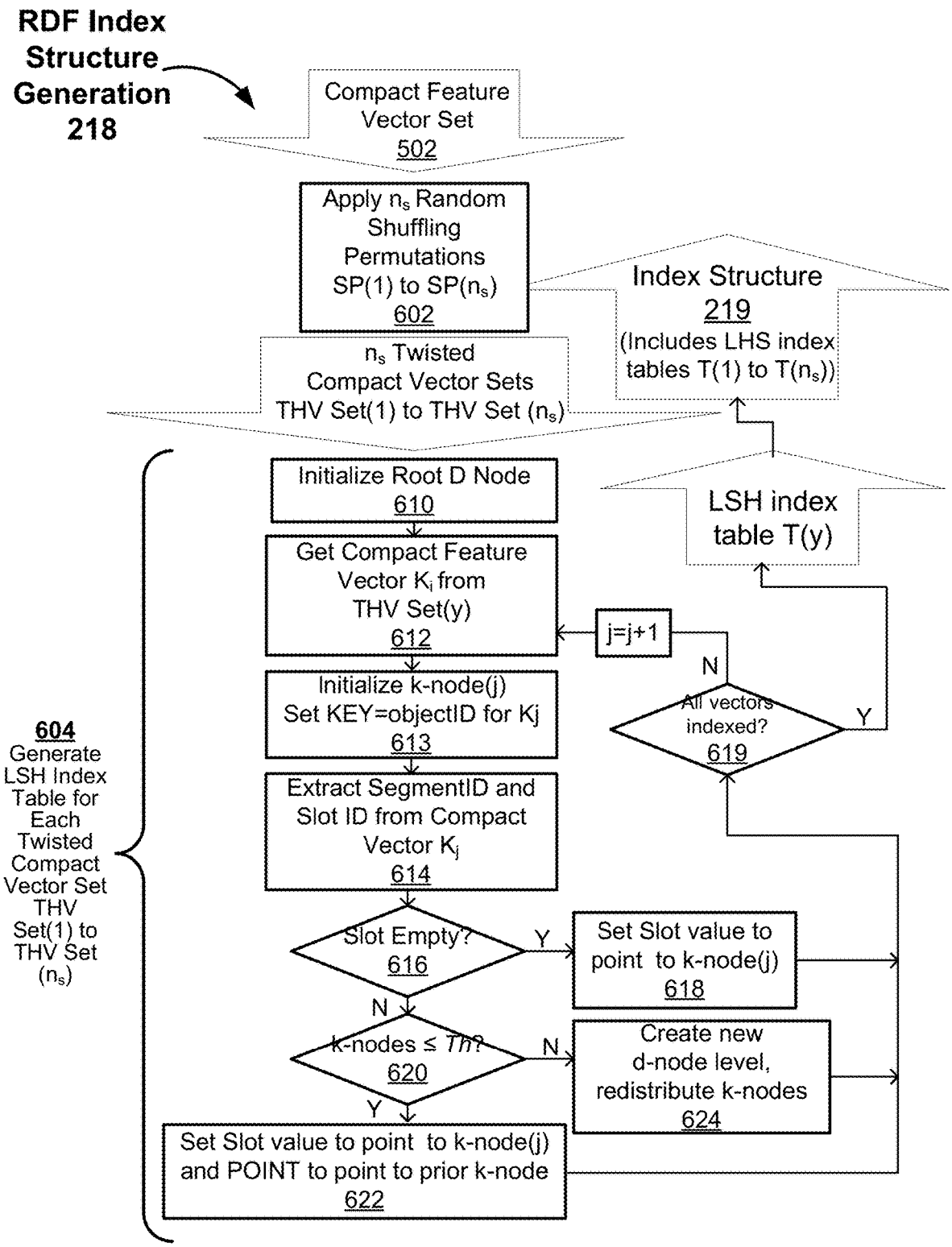
FIG. 6 shows an index structure generation process of the index generation method of FIG. 2 according to example embodiments.

Referring again to FIG. 2, after the compact feature vector set 502 is generated, a corresponding index structure 219 is then generated by random draw forest (RDF) index structure generation process 218. In this regard, FIG. 6 illustrates steps that are performed during the RDF index structure generation process 218 according to example embodiments.

For ease of reference, Table 1 below provides a summary of parameters relevant to RDF index structure generation process 218.

TABLE 1

| Parameter | Explanation |
|---|---|
| $K_j$ | compact feature vector. |
| m | number of hash bits in each compact feature vector. |
| M | Number of bits involved in partitioning the index. |
| l | maximum number of slots in a d-node. |
| li | number of slots in d-nodes for level i (variable for each level). |
| Th | threshold number of k-nodes under the same d-node slot. |
| s | number of bits to determine segment ID. |
| ns | number of shuffling permutations. |
| log2(l) | number of bits in twisted compact feature vector used to locate objects in d-node of each level (similarity threshold). |
| Dmax | max number of d-node levels (equal to (m − s)/log2(l)). |

Figure 7:
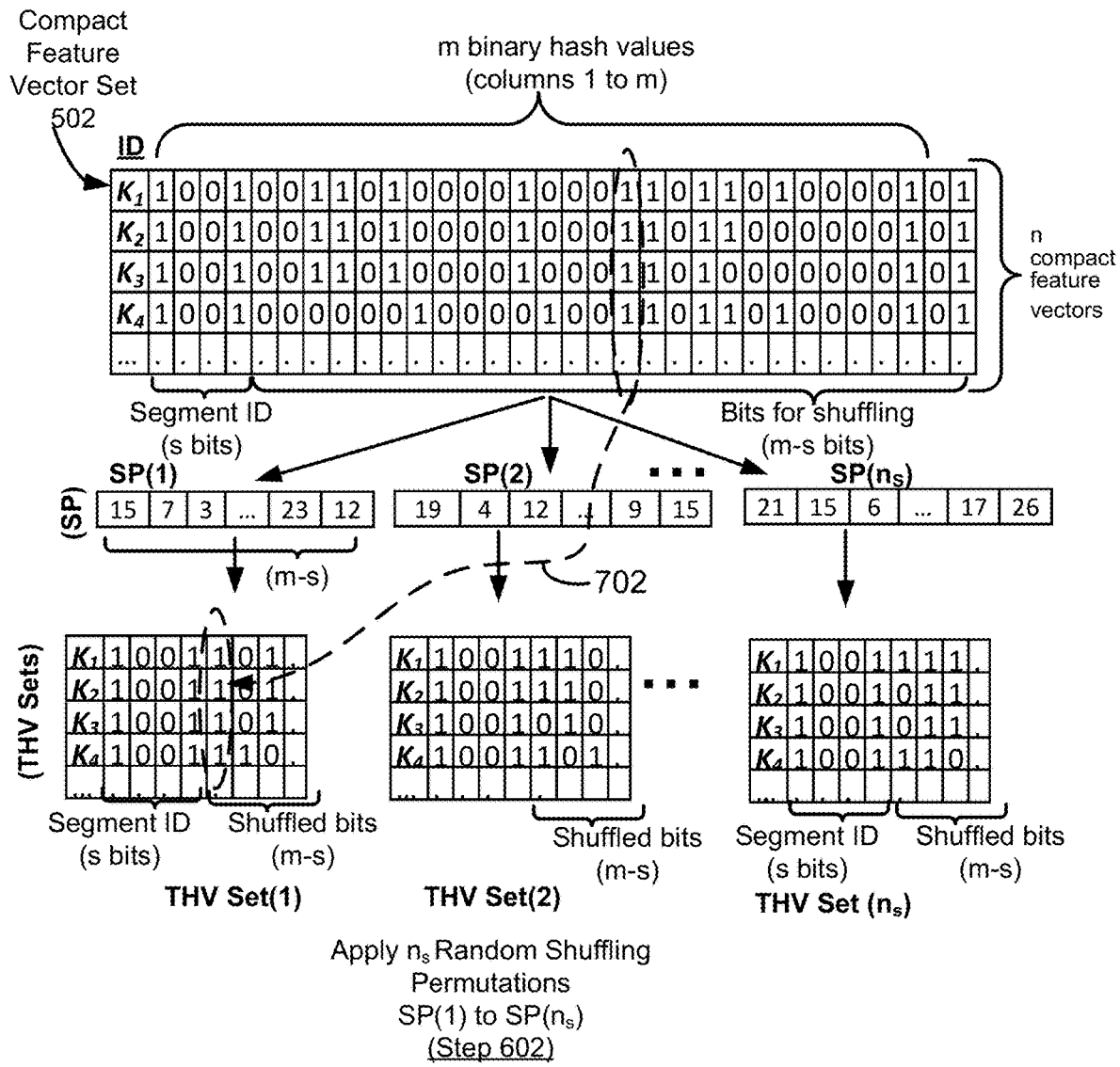
FIG. 7 shows an example of a random hash value shuffling process according to example embodiments.

As indicated in step 602, random shuffling permutations SP(1) to SP($n_s$) are applied to the compact feature vector set 502 to generate $n_s$ twisted compact feature vector sets THV Set(1) to THV Set ($n_s$). An example of step 602 is illustrated in FIG. 7. Shuffling permutations SP(1) to SP($n_s$) are randomly generated, and then applied to randomly shuffle the column positions of the hash values in the compact feature vector set 502 to different column positions in respective twisted compact feature vector sets THV Set (1) to THV Set ($n_s$). As noted above, each compact feature vector Kj includes m binary values. In one example embodiment, a first subset of s bits of each compact feature vector $K_j$ of the compact feature set 502 is used as a Segment ID, and only (m-s) bits of each compact feature vector Kj are shuffled during step 602. Accordingly, in example embodiments, each shuffling permutation SP(1) to SP($n_s$) specifies a random re-shuffling order of the compact feature vectors. By way of example, in FIG. 7 each of the positions in the shuffling permutation SP(1) to SP($n_s$) corresponds to a bit position column in the corresponding twisted compact feature vector sets THV Set(1) to THV Set ($N_s$), and the value in the position refers to a bit position column c+s of the compact feature set 502 to use as the source binary value to fill the column in the twisted compact feature vector set THV Set(i).

For example, in FIG. 7, m=32 and s=4. The first value in the first position of shuffling permutation SP(1) is 15, meaning that the 19th (15+s) hash value bit for compact feature vector $K_1$ in compact feature set 502 (which is a "1") is to be relocated to the first shuffled hash value bit position for compact feature vector $K_1$ in THV Set(1), as indicated by line 702. Accordingly, random shuffling permutation step 602 generates $n_s$ twisted hash value versions of the compact feature vectors $K_1$ to $K_n$. In each twisted hash value version, the hash value bit order is randomly shuffled with respect to the order of the compact feature set 502, however, within each THV Set the random shuffling order is the same for all of the compact feature vectors $K_1$ to $K_n$ such that column-wise similarities are maintained throughout the shuffling process. By generating $n_s$ twisted versions of the compact feature vector set 502 the MSB problem noted above can be mitigated as there is no longer any bias to any particular hash value bit order grouping. As shown in the THV sets of FIG. 7, in example embodiments, the s bits of the segmentID are pre-pended to the front of the (m−s) shuffled bits of each of the compact feature vectors $K_j$ within each of the THV Sets. Using the first s bits of the compact feature vectors $K_j$ as a SegmentID supports parallelism for the indexing described below—in particular, the number of possible segment IDs is $2^s$.

Referring again to FIG. 6, the next task (604) in RDF index structure generation process 218 is to generate a respective LSH index table T(1) to T($n_s$) for each of the twisted compact feature vector sets THV Set(1) to THV set ($n_s$). LSH Index Table Generation Task 604, which is shown as steps 610 to 622 in FIG. 6, is repeated for each of the twisted compact feature vector sets THV Set(1) to THV Set ($n_s$), resulting in $n_s$ LSH index tables.

Figure 8:
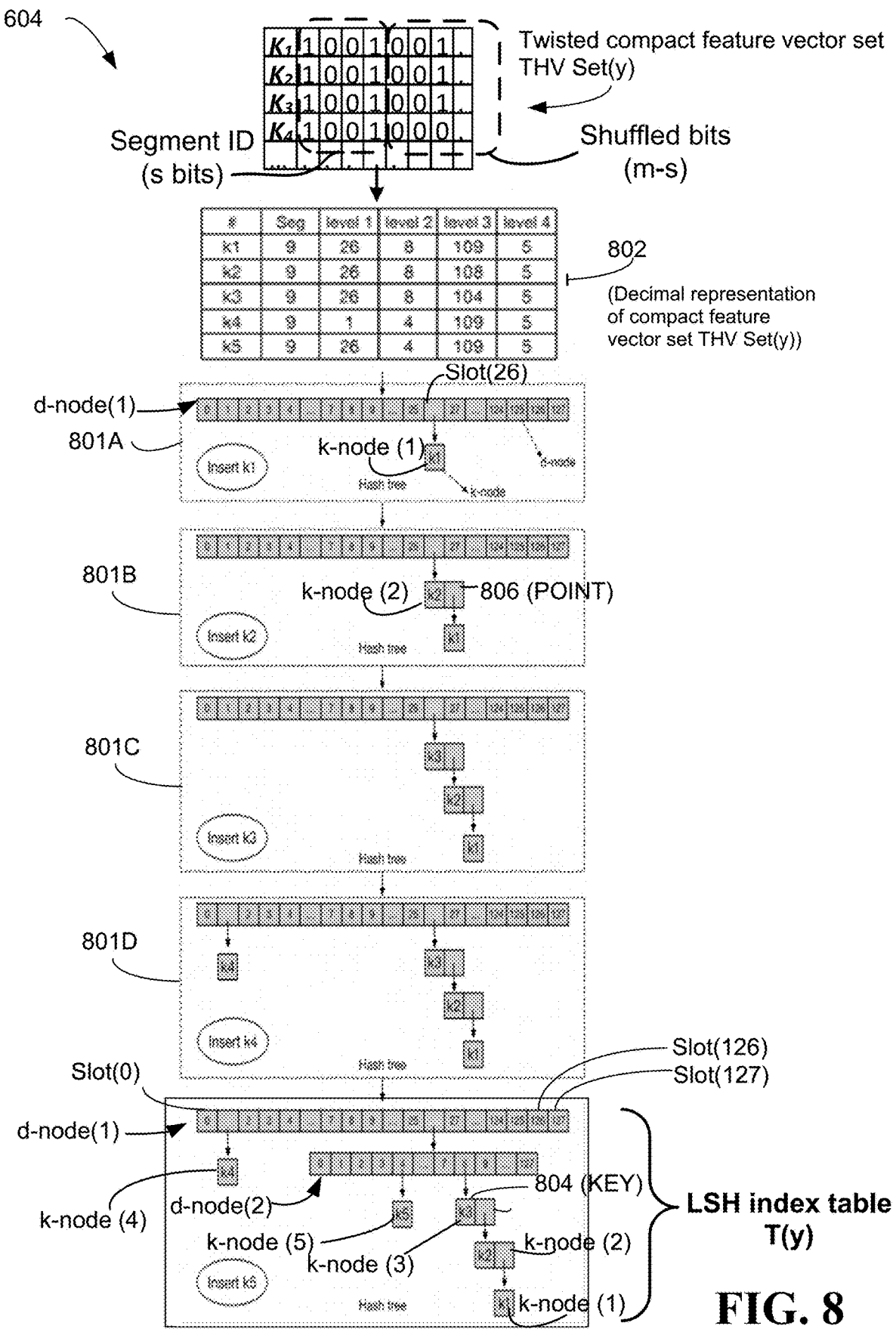
FIG. 8 shows an example of an LSH index table generation task of the process of FIG. 6.

LSH Index Table Generation Task 604 will now be described in the context of a twisted compact feature vector set THV Set(y) (where 1≤y≤$n_s$) and in conjunction with FIG. 8 which graphically illustrates the steps of LSH Index Table Generation Task 604 being performed in respect of compact feature vector set THV Set(y) to generate a corresponding LSH index table T(y). FIG. 8 illustrates intermediate stages 801A, 801B, 801C and 801D of the LSH index table T(y) as it is being generated. Table 802 is a decimal representation of the compact feature vector set THV Set(y) that is indexed in LSH index table T(y). In particular, in table 802, the column "SEG" is the decimal value of the first 4 bits (e.g. Segment ID) of the respective twisted compact feature vector $K_j$, the column "level 1" is the decimal value of the next 7 bits (e.g. the first 7 shuffled bits), the column "level 2" is the decimal value of the next 7 bits, the column "level 3" is the decimal value of the next 7 bits, and the column "level 4" is the decimal value of the next 7 bits. Thus, in the example of FIG. 8 where m=32, s=4 and the number of shuffled bits per twisted compact feature vector $K_j$ is m-s=28, the number of 7-bit levels is 4. In the example of FIG. 8, the Segment ID bits are "1001", providing a decimal Segment ID=9.

As shown in FIG. 8, LSH index table T(y) is an index tree structure that comprises two types of nodes, denoted as k-nodes and d-nodes. LSH index table T(y) as shown at the bottom of FIG. 8 includes two levels of d-nodes (a first level or root d-node (d-node (1)) and a second level d-node (d-node(2))), and five k-nodes (k-node (1) to k-node (5)). Each k-node (1) to (5) corresponds to a respective compact feature vector $K_1$ to $K_5$ of the compact feature vector set THV Set(y). In example embodiments, each LSH index table T(y) includes n K-nodes, where n is the number of compact feature vectors $K_j$.

Each d-node(i) is an integer array of $I_i$ slots (denoted as Slot( ) in the Figures, and numbered as Slot(0) to Slot(127) in FIG. 8 in which $I_i$=128), where $I_i$ is less than or equal to a predefined slot maximum I. The number of slots $I_i$ per d-node level is mutable. Each d-node Slot( ) corresponds to a bucket of compact feature vectors K that have been identified as meeting a similarity threshold with respect to each other. Each k-node contains two fields, namely KEY 804 and POINT 806. KEY 804 is an objectID that points to the raw feature vector (for example $K_1$ points to $V_1$), and POINT 806 stores the offset, if any, of the next k-node in the same Slot. A d-node Slot is used to store either a pointer to the first k-node associated with the Slot (provided that the number of k-nodes associated with the Slot does not exceed threshold Th), or a further d-node level (if the number of k-nodes associated with the Slot does exceed the threshold Th).

As indicated in step 610 of FIG. 6, LSH index table generation task 604 commences with the initialization of an I long d-node as a first level or root d-node(1). As noted above, to support parallelism, the first s bits of each compact feature vector K are treated as a SegmentID, which allows $2^s$ segments. This is a sufficient number to maximize parallelism for each twisted compact feature vector set THV Set(y). In example embodiments, the number of hash value bits in each twisted compact feature vector $K_j$ used to classify or locate the corresponding data object into a respective d-node slot is determined as $\log_2(I)$ and the maximum number of d-node levels is $(m-s)/\log_2(I)$. As will be described below, task 604 classifies twisted compact feature vectors $K_j$ into respective d-node slots based on the similarities between $\log_2(I)$ length groupings of successive twisted hash bits. In this regard, the $\log_2(I)$ bit set acts as a similarity threshold.

In example embodiments, the threshold Th represents the number of data objects that can be classified into a single Slot without further sub-classification. When the threshold Th is exceeded, further classification or sorting is required, which is accomplished by adding a further d-node level, and the twisted compact feature vectors can then be further classified based on a further set of $\log_2(I)$ bits. Thus, progressively more bits from the hash value of a compact feature vector can be used to provide more d-node indexing levels. When there are more than Th k-nodes under the same Slot, they are redistributed them to the next d-node level of the hash tree structure of LSH index table(y).

In the example represented in FIG. 8, I=128; Th=3; s=4; m=32; m-s=28; $\log_2(I)$=7; the 28 values of shuffling permutation SP(y) are {15, 7, 3, 4, 21, 6, 20, 14, 16, 26, 19, 28, 25, 18, 24, 13, 22, 9, 17, 27, 5, 2, 1, 11, 8, 10, 23, 12}; and the resulting 32 bit binary sequence of the first twisted compact feature vector in THV Set(y) is: Twisted compact feature vector $K_1$=10010011010000100011011010000101 (including the 4 bit segmentID followed by 28 shuffled bits). (Note that the examples of $K_j$ in FIG. 8 are not the same binary sequences as the examples shown in FIGS. 5 and 7).

Accordingly, in step 610, the first level or root d-node(1) is initialized to have a length of I=128 slots (as shown in intermediate stage 801A of FIG. 8.) As indicated in step 612 in FIG. 6, the next available twisted compact feature vector $K_j$ is obtained for the twisted compact vector THV Set(y). The first time step 612 is performed for a twisted compact feature vector set, the next available twisted compact feature vector will be the first compact feature vector in THV Set(y), namely $K_1$. It will be appreciated that steps 602 and 612 can be combined and the twisted hash values for a particular compact feature vector $K_j$ could be determined as part of step 612, rather than pre-calculated in step 602.

As indicated in step 613, a respective k-node(i) is initialized for the compact feature vector $K_j$. As noted above the k-node(i) includes two fields, namely KEY 804 and POINT 806. Accordingly, in the example of twisted compact vector $K_1$, the KEY 804 field of k-node(1) is set to point to the respective raw feature vector $v_1$. In the case when a new k-node is initialized, its POINT 806 field is initially set to null.

As indicated in step 614, a segmentID and SlotID are then extracted from the twisted compact feature vector $K_j$. In the present example of twisted compact feature vector $K_1$, the first four bits provide SegmentID=(1001)b=9. The next $\log_2(I)$=7 bits of $K_1$ are $(0011010)_b$=26, providing a level 1 d-node(1) SlotID of 26.

As indicated at step 616, a determination is made whether or not the identified d-node Slot(SlotID) is empty or not. If the Slot has not been occupied, as indicated in step 618 and illustrated by stage 801A in FIG. 8, the value in the corresponding Slot (e.g. Slot (26)) of root d-node (1)) is updated to point to an address of the respective k-node location (e.g. k-node (1)) in system storage, such as system storage device 1408 described below, (as noted above, the k-node (j) itself points to the address of the corresponding raw feature vector $v_i$).

After updating the respective d-node Slot, as indicated in step 619, a determination is made if all n of the compact feature vectors in the twisted compact feature vector set THV(y) have been classified into the TSH index table T(y). If so, the LSH Index table T(y) is complete and task 604 can be terminated for the THV set(y). If not, task 604 repeats. As indicated in step 612, the next compact feature vector $K_j$ is retrieved from the THV set(y). In the example of FIG. 8, the next compact feature vector is $K_2$. As illustrated in stage 801B in FIG. 8 and steps 613 and 614 of FIG. 6, a second k-node(2) is initialized for the compact feature vector $K_2$, and the segmentID and level 1 SlotID are extracted (as shown in table 802, in the present example the $K_2$ segmentID=9 and level 1 slotID=26, the same as $K_1$). In the case of compact feature vector $K_2$, in step 616 a determination is made that the d-node Slot(SlotID) (e.g. Slot(26)) is occupied. Accordingly, as indicted at step 620, a determination is then made as to whether the number of k-nodes that are allocated to the Slot(SlotID) without an intervening d-node layer exceeds the threshold Th. If the number of k-nodes under the d-node Slot(SlotID) is equal to or less than Th, then the new k-node can be included under this Slot in the hash tree of the LSH index table T(y). In particular, as indicated at step 622, the value in the Slot(SlotID) is set to point to the current k-node(i), and the POINT field of the current k-node(j) is set to point to the address of the k-node that was previously referenced by the Slot(SlotID).

In FIG. 8, an example of step 622 is represented in stage 801b, which shows the value of Slot(26) being updated to point to k-node(2). In turn, the POINT 806 field of k-node(2) is set to point to k-node(1) (which was previously identified in Slot(26)).

In the example of FIG. 8, the k-node(3) that is created for twisted compact feature vector $K_3$ also has segmentID=9 and level 1 slotID=26. As illustrated in stage 801c of FIG. 8, when twisted compact feature vector $K_3$ is processed, k-node(3) is initialized with its KEY 804 field pointing to the objectID of the raw feature vector $v_3$ (as per step 613) and, as per step 622, the value in d-node(1) Slot(26) is updated to point to k-node(3), and the POINT 806 field of k-node(3) is set to point to k-node(3).

In the example of FIG. 8, the k-node(4) that is created for twisted compact feature vector $K_4$ has segmentID=9, and level 1 slotID=1 (different than that of $K_1$ to $K_3$). Accordingly, as illustrated in stage 801d of FIG. 8, in step 616 a determination is made that Slot(1) is empty, and in step 618 the value in d-node(1) Slot(1) is updated to point to k-node (4).

In the example of FIG. 8, the k-node(5) that is created for twisted compact feature vector $K_5$ also has segmentID=9, and level 1 d-node slotID=26 (again, the same as that of $K_1$ to $K_3$). In this case, in step 620, a determination is made that the number of k-nodes under the level 1 d-node Slot(26) exceeds the threshold Th. As indicated in Step 624 and illustrated in the final version of LSH index table T(1) at the bottom of FIG. 8, the insertion of k-node(5) into the LSH index table requires that an additional d-node level (e.g. $2^{nd}$ level d-node(2)) be generated and the k-nodes under the upper level d-node Slot be redistributed among the Slots of the lower level d-node. As noted above, the use of multiple d-node levels effectively allows objects that are similar enough to be classed into a single d-node level Slot, as determined by a matching group of twisted hash value bit values, to be further sorted into different sub-buckets.

In the example of k-node(5) in FIG. 8, step 624 is carried out by initializing second level d-node(2) to have a length of I=128 Slots. The value of first level d-node(1) Slot(26) is set to point to the system storage address of d-node(2) (rather than directly to a k-node). The assignment of k-nodes (1), (2), (3) and (5) to the Slots of second level d-node(2) is similar to that described above in respect of the first level, however a different group of twisted hash bits from the twisted compact feature vectors are used to determine the second level SlotID than the first level SlotID. In particular, the next $\log_2(I)$ group of hashed bits in each of the twisted compact feature vectors $K_1$, $K_2$, $K_3$ and $K_5$ is used. Thus, in the example of $K_1$=100100110100001000110110100000101, the first four bits provide SegmentID=$(1001)_b$=9, the next $\log_2(I)$=7 bits $(0011010)_b$=26 provide level 1 d-node(1) SlotID of 26, and the next $\log_2(I)$=7 bits $(0001000)_b$=8 provide a level 2 d-node(2) SlotID of 8. In the example of FIG. 8, k-nodes (1), (2) and (3) all have the same second level SlotID of 9 (as illustrated in table 802), and accordingly are all assigned to second level d-node(2) Slot(9). In particular, d-node(2) Slot(9) points to k-node(3) which in turn points to k-node(2), which in turn points to k-node(1). However, hashed bits 12 to 18 of $K_5$ identify a $2^{nd}$ layer d-node slotID of 4, and according, k-node(5) is assigned to $2^{nd}$ layer d-node slot(4).

The steps 610 to 622 of LSH Index Table Generation Task 604 are repeated until all of the compact feature vectors $K_1$ to $K_n$ in a twisted compact vector set THV Set(y) are indexed into a respective LSH index table T(y). As represented by the 4 columns level 1 to level 4 in table 802, in the example of FIG. 8 the maximum level (Dmax) of d-nodes is 4. In some example embodiments, when the maximum level (Dmax) of d-nodes for a Slot in a LSH index table T is reached, the threshold Th is ignored and the length of K-node chains in the Dmax d-node level is unlimited.

LSH Index Table Generation Task 604 is repeated for all of the $n_s$ Twisted Compact Vector Sets THV Set(1) to THV Set ($n_s$) to generate $n_s$ respective LSH index tables T(1) to T($n_s$), which are collectively stored in system storage as index structure 219.

In example embodiments, the index generation method 202 described above can be summarized by the following general steps that follow feature extraction process 210. Step 1: Calculate the LSH hash value of an input raw feature vector $v_i$ to produce a corresponding compact feature vector $K_j$. The first s bits compact feature vector $K_j$ are used as a SegmentID. Then, the next $\log_2(I)$ bits of the compact feature vector $K_j$ following the SegmentID, as shuffled by a random shuffling permutation, are used to generate an Integer range from 0 to I as the slotID for a slot of the first level (e.g. d-node(1)) of an index table (e.g. LSH Index table T(y)). Step 2: If the slot has is not occupied, it is updated to point to the address of raw feature vector $v_j$. Step 3: If the slot has been occupied, and the number of objects under this slot is equal or less than Th, then a k-node is added under the slot. If the number of objects under this slot is larger than Th, then a new d-node level is added under the slot, followed by Step 4: The next $\log_2(I)$ items from the shuffling permutation is used to provide the corresponding $\log_2(I)$ bits of a compact feature vector $K_j$ as the slotID in the new d-node, and the k-nodes are redistributed in this new d-node.

Figure 9:
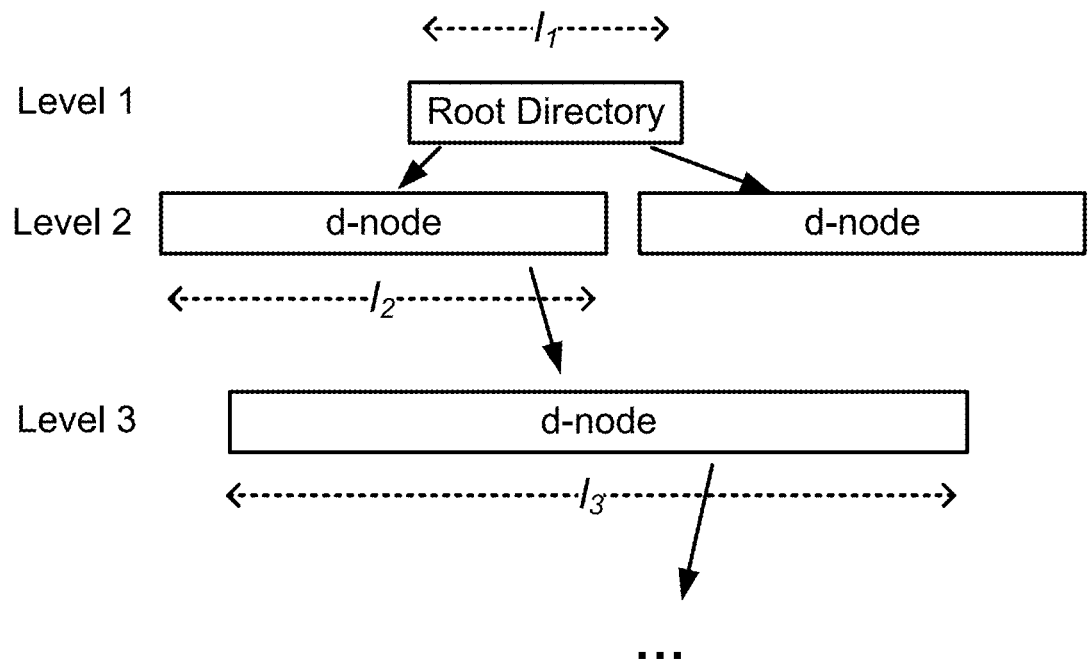
FIG. 9 illustrates variable length scaling for different d-nodes in an LSH index table.

In example embodiments, the number of slots Ii can be set at a different value for each d-node level in LSH index table T(y), as illustrated in FIG. 9. The variable Ii controls the number of bits to locate the objects in different d-node levels of the hash tree defined by LSH index table T(y). For instance, in one example I=32, $\log_2(I)$=5, and 5 bits of the compact feature vector are used to determine the slots for all d-node levels. By this design, each d-node level is treated with the same degree of resolution. Alternatively, different resolutions can be used for different levels. For example, for first level d-node(1), a shorter $I_1$ could be used, which enables datasets with small numbers of similar objects to gain enough efficient candidates. In lower levels, the number of bits can be gradually increased, with $I_1<I_2<I_3$. The only condition for objects going deeper is number of the "similar" objects under the same slot being equal or larger than Th. Therefore, for the second level, the resolution should be increased to make these "similar" objects be divided into different "similar" groups with higher similarities.

Thus, in example embodiments, index structure generation process 218 implements a random draw that produces random draw forest (RDF) index structure 219 in which each LSH index table T(y) represents a respective tree in the RDF index structure 219. The random draw performed during index structure generation process 218 is a function of the randomly generated shuffling permutations (sp).

Referring again to FIG. 2, similarity search method 204 will now be described. A query object 220 is received. In an example embodiment, the query object 220 is an unstructured object data such as an image file, a video sample, an audio sample, or text string. As indicated in feature extraction process 222, query object 220 is converted to a raw query feature vector Qv in the same manner that data objects 208 were converted to raw feature vectors in feature extraction process 210. The resulting raw query feature vector Qv is then converted at dimensionality reduction process 226 to an m-length binary sequence compact query vector Qk using the same process and previously generated hash functions as described above in respect of dimensionality reduction process 214.

The compact query vector Qk is then processed in combination with the index structure 219 for search process 230. In an example embodiment, $n_s$ shuffled versions Qks(1) to Qks($n_s$) of the compact query vector Qk are generated by applying each of the above mentioned shuffling permutations SP(1) to SP($n_s$) to the compact query vector Qk. Each of these $n_s$ shuffled versions Qks(1) to Qks($n_s$) used to search a respective LSH index table T(1) to T($n_s$). For example, compact query vector Qks(y), which has been shuffled according to shuffling permutation SP(y) is used to search corresponding LSH index table T(y). In particular, the first group of $\log_2(I_1)$ bits of compact query vector Qks(y) (excluding the s bits used for SegmentID) are used to determine a SlotID for the root (e.g. first level) d-node(1) of LSH index table T(y). If the matching slot of the first level d-node(1) points to a k-node, then all of data objects 208 that are addressed in the k-nodes under the slot are returned as candidate result objects 232. In the event that the matching slot of the first level d-node(1) points to a second level d-node, then the next group of $\log_2(I_2)$ bits of compact query vector Qks(y) are used to determine a SlotID for the second level d-node(2) of LSH index table T(y), and any data objects 208 that are addressed in the k-nodes directly under the matching d-node(2) slot without an intervening d-node are returned as candidate result objects 232. In the event that the matching d-node(2) slot points to a further, third level d-node(3), the process of determining additional lower level slotIDs from successive bits of the compact query vector Qks(y) are repeated until all k-nodes under any matching slots are processed and all candidate result objects 232 returned.

Accordingly at the completion of search process 230, the candidate results 232 includes data objects 208 that correspond to each of the shuffled query vectors Qks(1) to Qks($n_s$) as identified in the respective LSH index tables T(1) to T($n_s$). As indicated by items 232 to 240 in FIG. 2, the candidate results 232 can then be filtered using a filtering process 234 to produce filtered results 236 that can be ranked using a ranking process 238 to produce a ranked list of objects as the final results 250. The methodologies applied in filtering process 235 and ranking process 238 may for example be similar to those used in existing similarity searching processes.

As described above, the index generation method 202 and similarity search method 204 use a random draw forest (RDF) index structure that overcomes the MSB problem. Using the RDF index structure 219 described above for similarity searching may in at least some applications result in faster and more accurate similarity searches than prior methods. By improving the high quality candidates included in candidate results, the index structure 219, when used in a similarity search, may in at least some applications achieve better approximate nearest neighbor performance (accuracy and quality of results) than prior methods, and have a better time performance compared to at least some prior methods.

In example embodiments the index generation method for similarity searching based on RDF (random draw forest) described above includes: Step 1: Based on the input raw feature vectors, by using locality sensitive hashing, produce hash values; Step 2: Based on the hash values, by using random draw, produce the twisted hash values; Step 3: Based on the twisted hash values, by following the adaptive hash tree building steps, produce the random draw forest (multiple hash trees); Step 4: Based on the query's raw feature, by using locality sensitive hashing, produce the query's hash value; and Step 5: Combine the query's hash value and random draw forest as input information, by following the similarity search strategy, produce the query's similar objects from dataset.

As noted above, in example embodiments index generation method 202 and similarity search method 204 are performed by software (that may include one or more software modules) that are implemented on one or more digital processing systems. In some examples, instances of index generation method 202 or similarity search method 204 may be implemented on one or more digital processing systems that are implemented as virtual machines using one or more physical computing systems.

Figure 10:
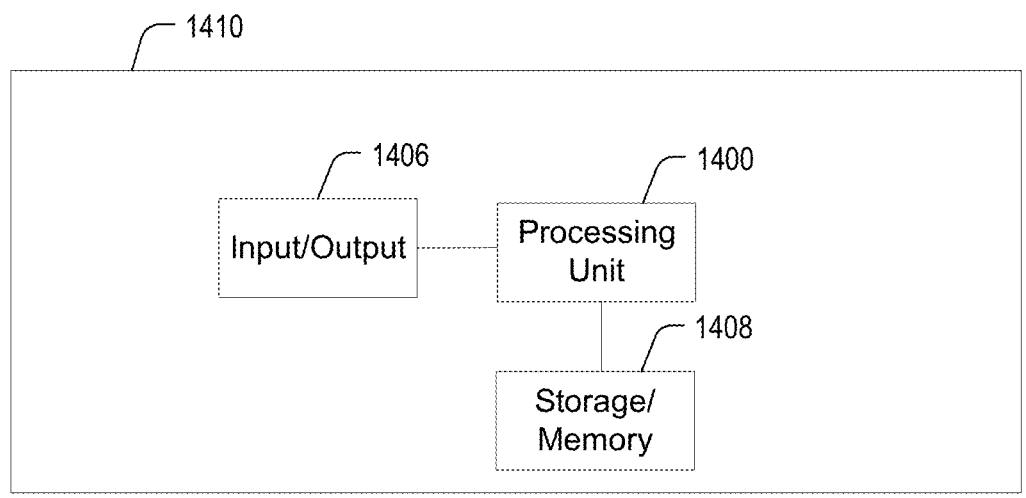
FIG. 10 is an example of a digital processing system that can be used to implement methods and systems described herein.

FIG. 10 illustrates an example of a digital processing system 1410 that could be used to implement one or both of index generation method 202 and similarity search method 204. As shown in FIG. 10, the system 1410 includes at least one processing unit 1400. The processing unit 1400 implements various processing operations of the system 1410. For example, the processing unit 1400 could perform data processing, power control, input/output processing, or any other functionality enabling the system 1410 to operate. The processing unit 1400 may also be configured to implement some or all of the functionality and/or embodiments described in more detail above. Each processing unit 1400 includes any suitable processing or computing device configured to perform one or more operations. Each processing unit 1400 could, for example, include a microprocessor, microcontroller, digital signal processor, field programmable gate array, or application specific integrated circuit, and combinations thereof.

The system 1410 further includes one or more input/output devices 1406 or interfaces (such as a wired or wireless interface to the internet or other network). The input/output devices 1406 permit interaction with a user or other devices in a network. Each input/output device 1406 includes any suitable structure for providing information to or receiving information from a user, such as a speaker, microphone, keypad, keyboard, display, or touch screen, including network interface communications for receiving query objects and communicating search results.

In addition, the system 1410 includes at least one system storage device 1408. The system storage device 1408 stores instructions and data used, generated, or collected by the system 1410. For example, the system storage device 1408 could store software instructions or modules configured to implement some or all of the functionality and/or embodiments described above and that are executed by the processing unit(s) 1400. System storage device(s) 1408 can also include storage for one or more object databases 206, main tables 250, compact feature vector sets 502 and index structures 219. System storage device(s) 1408 can include any suitable volatile and/or non-volatile storage and retrieval device(s). Any suitable type of memory may be used, such as random access memory (RAM), read only memory (ROM), hard disk, solid state disc, optical disc, subscriber identity module (SIM) card, memory stick, secure digital (SD) memory card, and the like.

In the examples described above, index generation method 202 generates an RDF index structure 219 for the compact feature vector set 502 that represents n objects 208 stored in object database 206. In the above example, the compact feature vector set 502 is treated as a single partition group and indexed using a single RDF index structure 219. However, in some examples, the volume of data objects that need to be indexed is so large that representing the corresponding compact feature vector set in a single index structure can lead to system latency and inefficiency, especially in the context of concurrent search query processing. As noted in the background above, partitioning can be used to break groups of data objects into smaller groups of similar data objects for indexing and searching purposes.

As also noted above, in addition to the MSB problem that can be created when indexing compact feature vectors, errors can also be introduced through sub-index partitioning issues. Partitioning can be an important part of hash based index generation methods and as mentioned in the background, existing partition methods use fixed number of head bits to divide the hash values (e.g. put hash values into different partitions). These existing methods might partition very similar feature vectors in different partitions or put extremely different hash values in same partition just because they rely on limited number of bits. Dividing the hash values into wrong sub-indexes (e.g. partitions) affects the accuracy and consistency of similarity searching. The following is a description of an improved partitioning method to mitigate problems with conventional partitioning methods. In the presently described embodiment, a partitioning method is used to generate partition groups that are each then respectively indexed using the RDF index structure generation process 218 described above. However, the partitioning method described herein is not limited to being used in combination with the RDF index structure generation process but rather, in other example embodiments, may be used to produce partition groups that can be respectively indexed using known or suitable indexing methods.

Figure 11A:
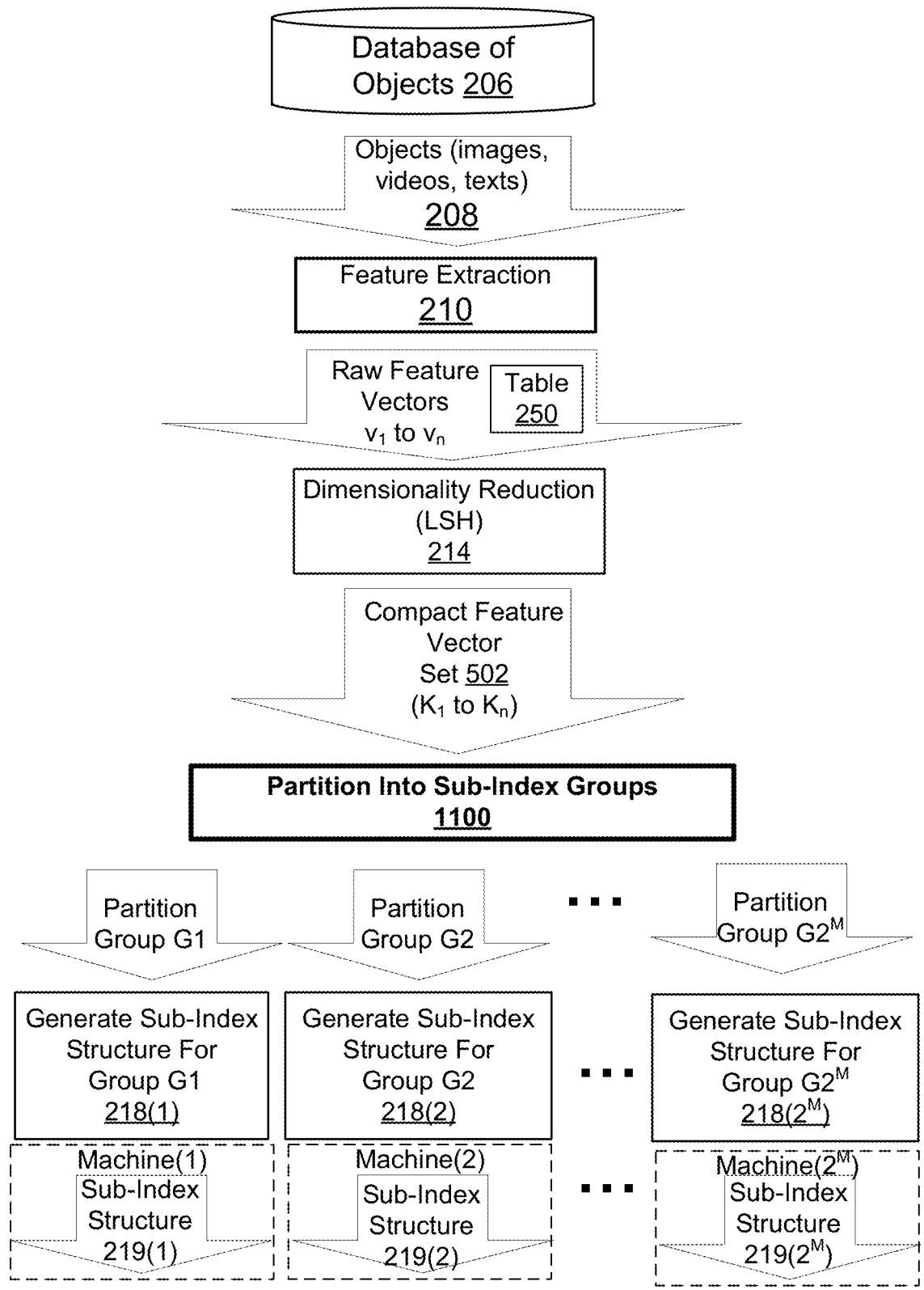
FIG. 11A shows an example of an index generation method that includes partitioning according to an example embodiment.

The partitioning method described herein uses multiple layers of LSH which use orthogonal angle hash functions, and can be used in conjunction with the indexing generation and search methods described above in respect of FIGS. 2 to 9. In example embodiments that will now be described, during the index generation method, compact feature vector set 502 is divided into multiple partition groups before being indexed. A corresponding sub-index structure is then created for each partition group. In this regard, FIG. 11A shows an alternative example of index generation method 202A that is similar to index generation method 202 discussed above except that the index generation method 202A includes an additional procedure (process 1100 in FIG. 11A) of partitioning the compact feature vector set 502 into a total of $2^M$ partition groups 1 to $2^M$. The partition groups 1 to $2^M$ are then each subjected to a respective RDF index structure generation process 218(1) to 218($2^M$) to generate respective sub-index structures 219(1) to 219($2^M$).

As will be explained in greater detail below, the partition method uses a distributed layered LSH method that enables the parallelism of indexing and search methods. It is a content-based partition strategy, enabling each search query to be mapped to only one partition group. The orthogonal hash family is used to partition objects (as represented by compact feature vectors) more accurately. A stepwise search is described below for an accurate searching way to search over the sub-indexes that correspond to the respective partition groups.

Index generation method 202A will now be explained in greater detail with reference to FIG. 11A, which provides an overview of the entire index generation method 202A, and FIG. 11B which shows the partitioning process 1100 in greater detail. Reference will also be made to FIG. 12, which schematically illustrates parts of the index generation method 202A for the specific example of m=6 when the number of sub-index partition groups is 4 (i.e. $2^M$=4, M=2).

As indicated in FIG. 11A index generation method 202A includes preliminary operations that are the same as those of index generation method 202 described above, namely feature extraction process 210 and dimensionality reduction process 214. In particular, feature extraction process 210 processes n unstructured data objects 208 to generate n corresponding representative d-dimensional raw feature vectors $V_1$ to $V_n$ that are stored, for example, in a main table 250 that includes the raw feature vectors $V_1$ to $V_n$ with pointers (for example an object ID) to their respective unstructured data objects 208.

Dimensionality reduction process 214 applies a first layer LSH to process the n d-dimensional raw feature vectors $V_1$ to $V_n$ and generate n corresponding m-dimensional compact feature vectors $K_1$ to $K_n$, that are stored, for example, as a compact feature vector set 502 that includes the compact feature vectors $K_1$ to $K_n$ with pointers (for example an object ID) to one or both of their respective raw feature vectors $V_1$ to $V_n$ and unstructured data objects 208.

In example embodiments, the LSH based dimensionality reduction process 214 of index generation method 202A uses the orthogonal angle hash functions h described above in respect of the index generation method 202, which have better performance than original angle hash functions. As described above, using the geminated orthogonal hash functions, hash values from the compact feature vectors $K_1$ to $K_n$ are generated for each raw feature vector $V_1$ to $V_n$ associated with an object. Each compact feature vectors $K_j$ is an m long sequence of 0's and 1's. By way of example, the illustrated dimensionality reduction process 214 of FIG. 12 where m=6 demonstrates the hashing of raw feature vector $V_1=\{fv_1, fv_2, \ldots, fv_d\}$ with the m-length hash function chain $G_i=\{h_1, h_2, \ldots, h_m\}$ to generate the m-length binary sequence compact feature vector $K_1=G_i(V_1)=\{h_1(V_1), h_2(V_1), h_3(V_1), h_4(V_1), h_5(V_1), h_6(V_1)\}=\{0,0,1,0,1,0\}$.

Following the first layer LSH dimensionality reduction process 214, the compound hash values (i.e. compact feature vectors $K_1$ to $K_n$) of compact feature vector set 502 are then partitioned into sub-index partition groups by partitioning process 1100, which will now be described in greater detail with FIG. 11B. The partitioning process 1100 functions to assign compact feature vectors Kj that are sufficiently similar into respective partition groups.

In order to partition similar objects (each represented by a respective compact feature vector Kj) into respective partition groups, a new LSH index layer is introduced, which is called partition layer LSH index. The principle behind the partition layer LSH index is that: similar objects (as represented by raw feature vectors) have a high possibility p1 to have similar hash values after a first layer LSH has been performed; and similar compact feature vectors have a high possibility p2 to have similar hash values after a second, partition layer LSH is performed. Therefore, after two layers of LSH, similar objects have p1*p2 possibility of having similar compact feature vectors. This principle is the basis for defining partition groups and generating a sub-index-ID (SubID) for each partition group, as shows in FIG. 11A and FIG. 12. In at least some examples, each compact feature vector Kj is included in only one partition group. Accordingly, at search time, each search query only needs to access the sub-index structure for only a single partition group, which improves the speed of similarity searching. Furthermore, the robustness of the partitioning method, to handle concurrency, can be easily controlled by a single parameter, M, where M is the number of bits used for partitioning into partition groups.

Figure 11B:
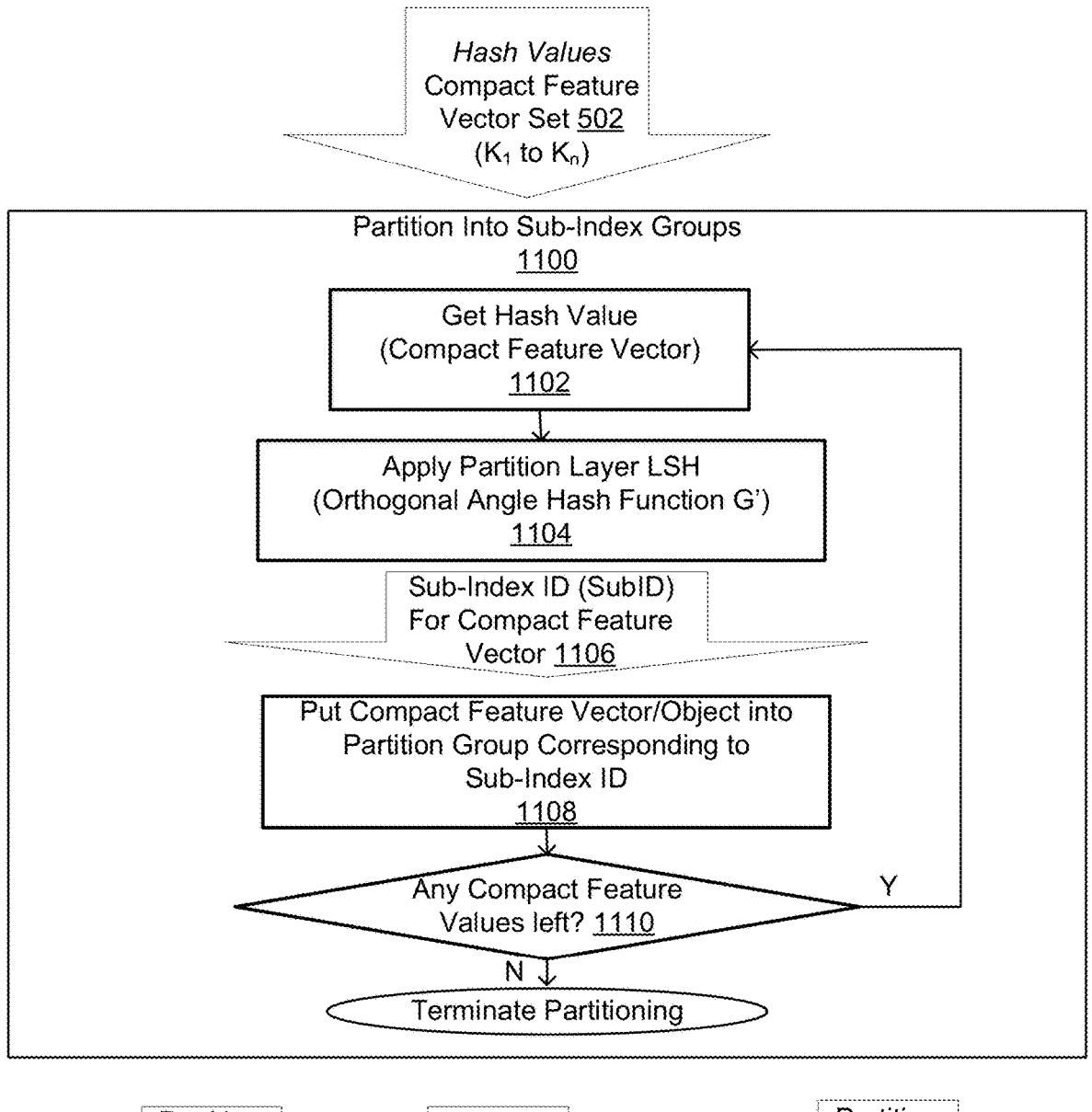
FIG. 11B shows an example of the partitioning method included in the index generation method of FIG. 11A according to example embodiments.
Figure 12:
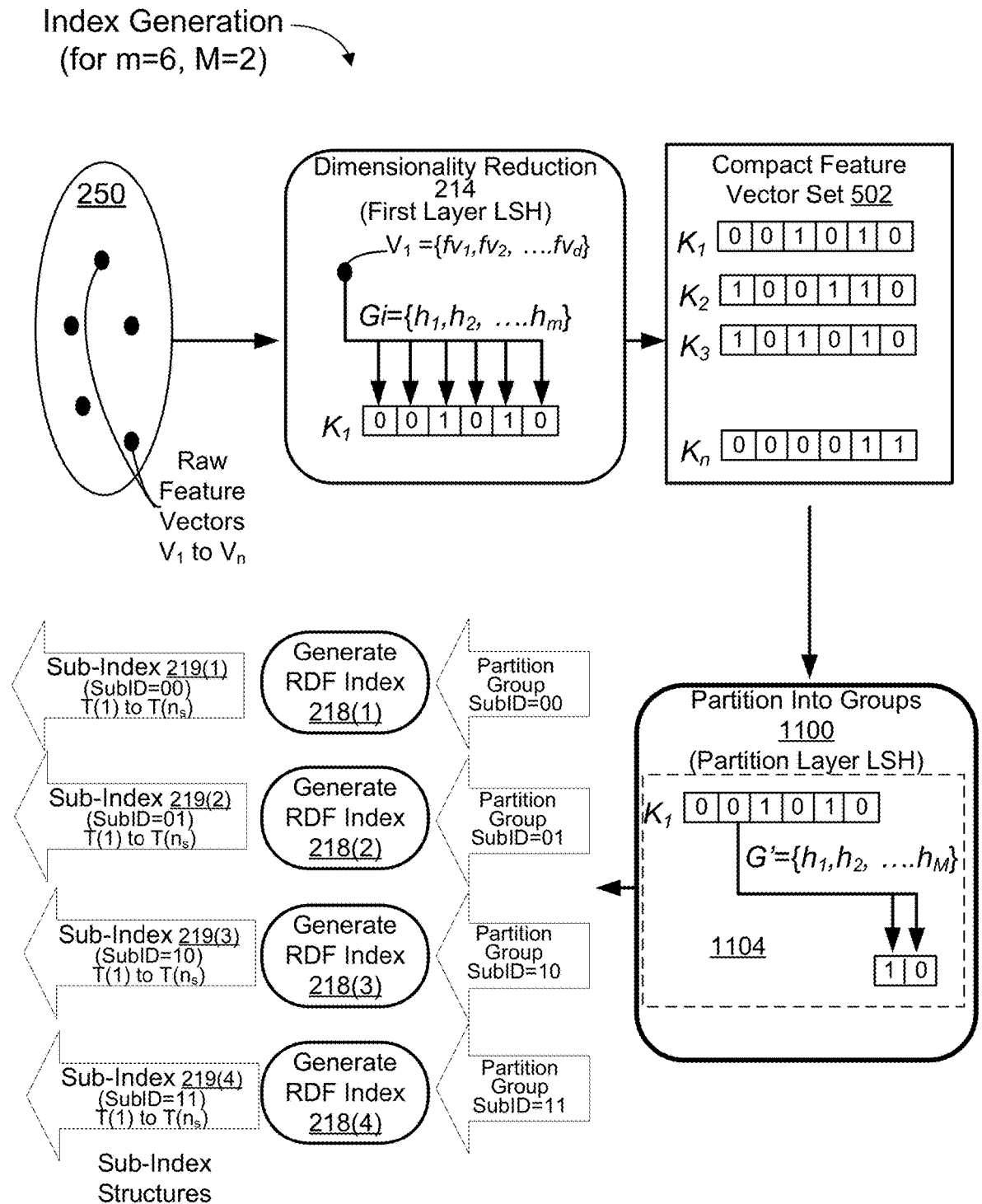
FIG. 12 shows a schematic representation of the index generation method of FIG. 11A, including the partitioning method.

As shown in FIG. 11B, the partitioning process 1100 is repeated for each of the n compact feature vectors Kj that are contained in the compact feature vector set 502, and at the completion of partitioning process 1100 each of the n compact feature vectors Kj is assigned to a respective partition group 1 to $2^M$ of similar compact feature vectors Kj, where similarity is a function of a partition layer LSH process 1104. The number of partition groups is $2^M$ and each partition group and its respective sub-index structure 219 (SubID) is mapped to a unique M-bit sub-index ID (SubID).

As indicated in block 1102, each repetition of partitioning process 1100 begins with getting the next compact feature vector $K_j$ from the compact feature vector set 502. As indicated at process block 1104, a partition layer LSH is then performed on the compact feature vector $K_j$ to generate a sub-index ID (Sub-ID) and thereby assign the compact feature vector $K_j$ to a respective one of the partition groups 1 to $2^M$. In example embodiments, applying a partition layer LSH comprises hashing the compact feature vector $K_j$ with a hash function chain G' that includes M orthogonal local sensitivity based hash functions (e.g. Sub-ID for $K_j$=G' $(K_j)=\{h_1(K_j), h_2(K_j), \ldots, h_M(K_j)\}$). FIG. 13 is a pseudo-code representation of the process blocks 1102 and 1104 of partitioning process 1100, in which compact feature vectors Kj (identified in represented in FIG. 13 as "Hash value matrix E[j,i]") are each assigned a respective sub-index ID (SubID). FIG. 12 illustrates an example of the LSH partitioning process applied to 6-bit compact feature vector K1=$\{0,0,1,0,1,0\}$ at process block 1104. The m=6 bit compact feature vector $K_1$ is hashed with the function chain G'=$\{h_1,h_2\}$ (M=2) to output a 2-bit sub-index ID (SubID)= G'($K_1$)=$\{h_1(K_1),h_2(K_1)\}$=$\{1,0\}$. The first binary value of the sub-index ID is the hash output of the 6-bit compact feature vector $K_1$=$\{0,0,1,0,1,0\}$ and the orthogonal hash function $h_1$, and the second binary value of the sub-index ID is the hash output of the 6-bit compact feature vector $K_1$=$\{0,0,1,0,1,0\}$ and the orthogonal hash function $h_1$.

As indicated by process block 1108 in FIG. 11B, once a sub-index ID is determined for a compact feature vector $K_j$, the compact feature vector $K_j$ is added to the corresponding partition group 1 to $2^M$. In the example of FIG. 12, the 6-bit compact feature vector $K_1$=$\{0,0,1,0,1,0\}$ is added to partition group 3, as identified by its binary sub-index ID, SubID=$10_b$. Thus, each compact feature vectors $K_i$ (and its corresponding raw feature vector $V_i$ and unstructured data object 208) is individually assigned to a sub-index partition group of similar vectors.

At the completion of partitioning process 1100, the compact feature vectors $K_1$ to $K_n$ of compact feature set 250 are distributed among M partition groups, each of which is a subset of the compact feature vectors $K_1$ to $K_n$. As indicated in FIGS. 11A and 12, each one of the M partition groups are then processed using a respective RDF index structure generation process 128(1) to 218 ($2^M$) to generate respective RDF sub-index structure 219(1) to 219($2^M$). Each RDF index structure generation process 128(1) to 218 ($2^M$) processes its respective sub-index partition group in the same manner as described above with reference to FIGS. 6 to 9 in respect the processing of compact feature vector set 502 by index structure generation process 218. Each of the respective RDF sub-index structures 219(1) to 219($2^M$) includes respective LHS index tables T(1) to T($n_s$), where the $n_s$ can be individually selected for each of the RDF sub-index structures 219(1) to 219($2^M$).

As illustrated by the dashed boxes labelled "Machine(1)" to "Machine($2^M$)" in FIG. 11A, in at least some example embodiments, each of the RDF sub-index structures 219(1) to 219($2^M$) is hosted or stored at a different digital processing system to support concurrent queries. In some example, the multiple different digital processing systems may include multiple virtual machines implemented on a common digital processing system (for example digital processing system 1410), or on physically different machines (for example multiple digital processing systems 1410). The size of M determines the number of sub-index partition groups, which affects the ability to support concurrent query requests. The larger the size of M, the greater the ability to handle concurrent searches. Accordingly, in example embodiments each of the sub-index structures 219(1) to 219($2^M$) is stored as an independent, searchable structure, enabling concurrent searching of the sub-index structures.

Searching of RDF sub-index structures 219(1) to 219($2^M$) will now be described with reference to FIG. 14 which shows a similarity search method 204A according to example embodiments. Similarity search method 204A is similar to the similarity search method 204 described above in respect of FIG. 2, except that similarity search method 202A includes additional processes of generating a sub-index ID for the compact feature query vector Qk (process 1450) and, in at least some example embodiments, conducting a step wise search index structures with similar sub-index IDs as the compact feature query vector Qk (process 1454). As indicated in FIG. 14, the similarity search method 204A includes feature extraction process 222 to convert a query object into a d-dimensional raw feature query vector Qv, and LSH dimensionality reduction process 226 to reduce the d-dimensional raw feature query vector Qv to an m-dimensional compact feature query vector $Qk=G_i(Qv)=\{h_1(Qv), h_2(Qv), \ldots h_m(Qv)\}$.

An additional LSH level is applied at process 1450 to determine the appropriate RDF sub-index structure 219 (SubID) for searching for compact feature vectors Ki that are similar to the compact feature query vector $Q_k$. In particular, the same operation of applying a second LSH layer described above in respect of process 1104 is applied to the query vector Qk. In particular, a sub-index ID (SubID) is determined for the query vector Qk by applying orthogonal angle hash function G' as follows:

SubID for query vector $Qk=G'(Qk)=\{h_1(Qk), h_2(Qk), \ldots h_M(Qk)\}$.

Figure 14:
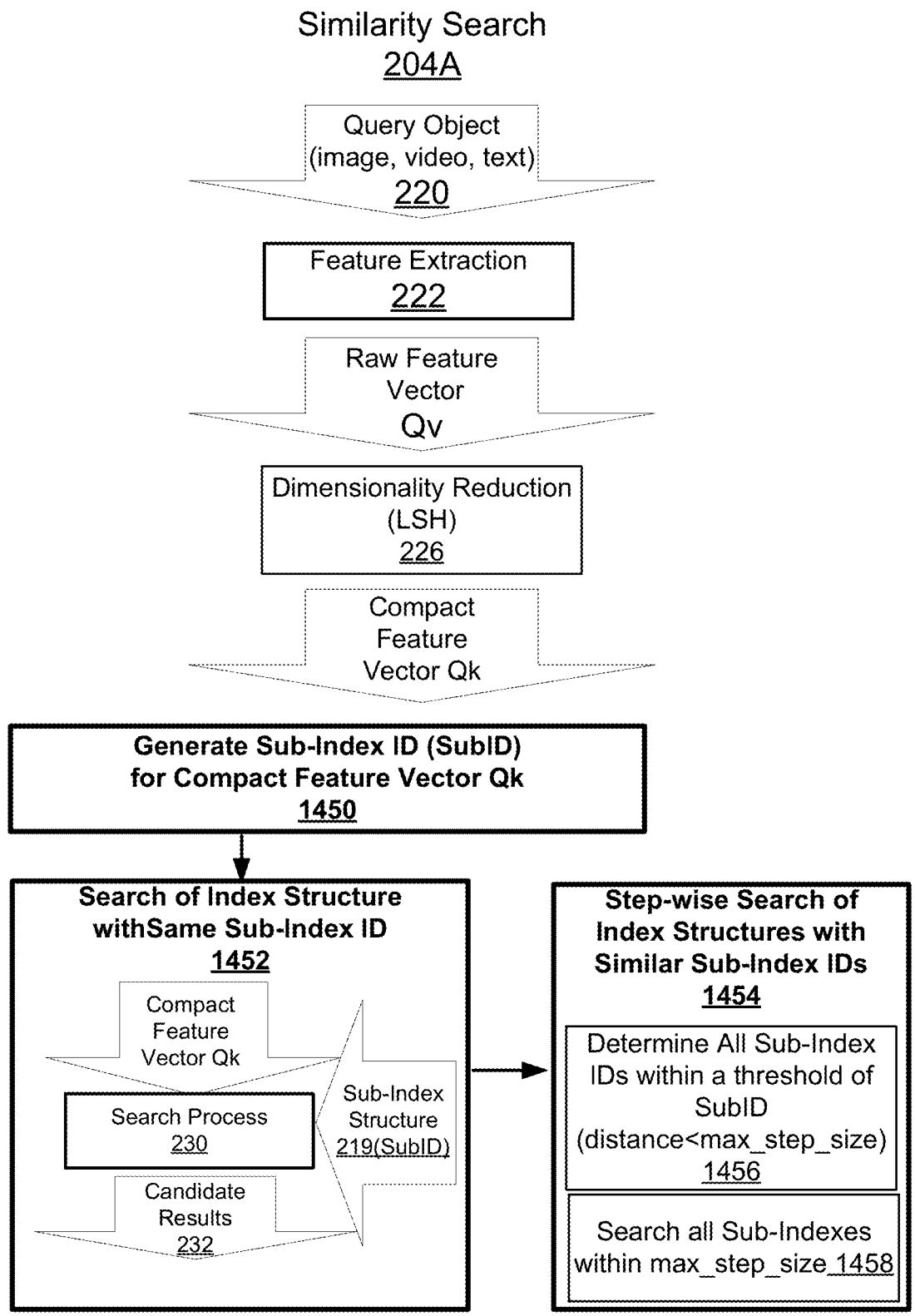
FIG. 14 is a flowchart of a step-wise search using the partitioned index.

As indicated by process 1452 in FIG. 14, the SubID for the compact feature query vector Qk is used to identify the RDF sub-index structure 219(SubID) for the sub-index partition group that is most likely to include objects similar to the search query object. The same search process 230 as described above in respect of FIG. 2 is then applied to identify candidate results 232 from the RDF sub-index structure 219(SubID).

Figure 15:
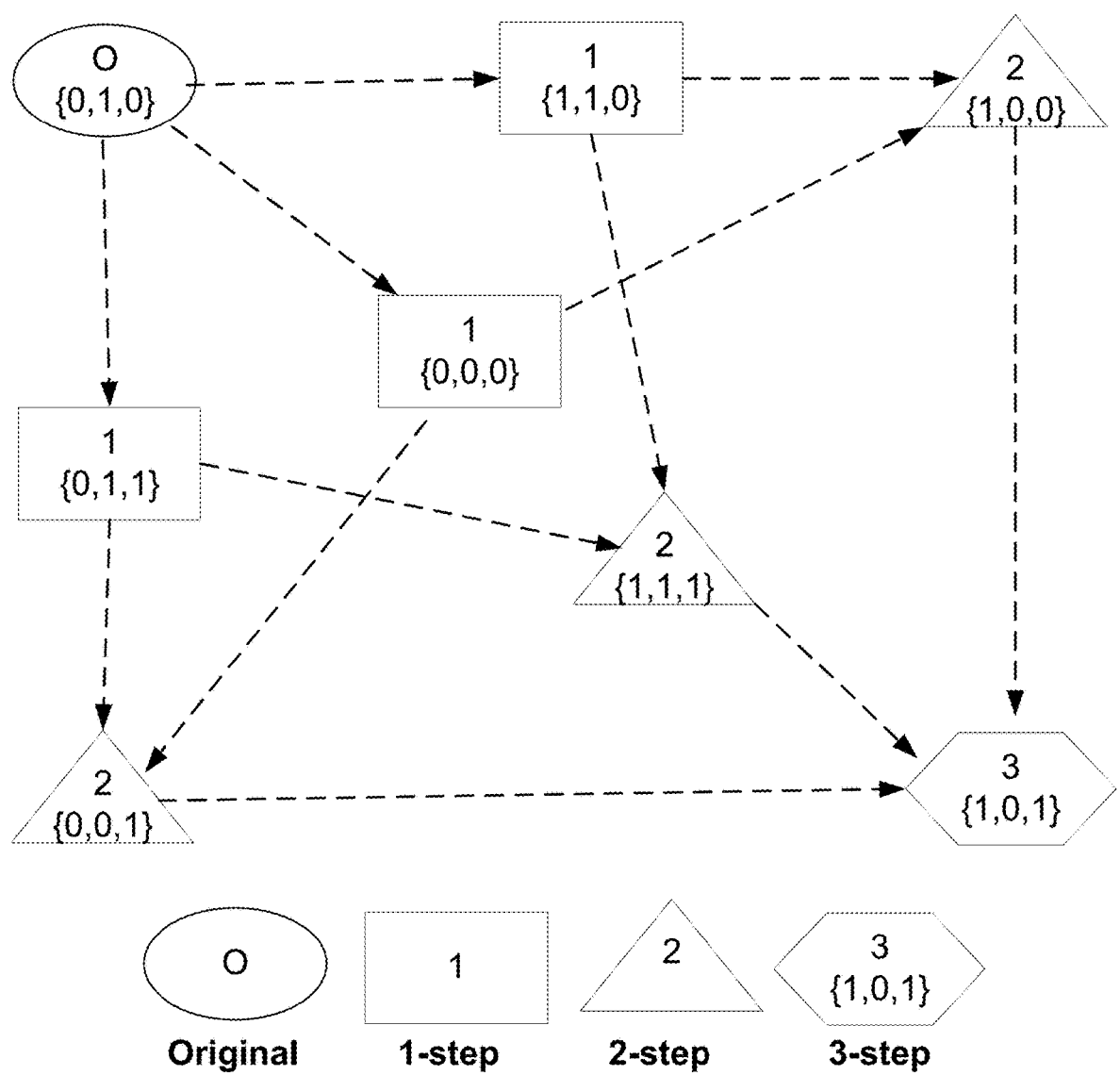
FIG. 15 illustrates a delta-step sub-index calculation.

Ideally, a partition method strives to divide all similar objects into one sub-index partition group). However, due to the approximate nature of applying a partition layer LSH to assign a partition group sub-index ID, it is possible that in at least some applications similar objects are still likely to be divided into different partition groups, which can affect the accuracy and consistency of similarity searches using the generated sub-index structures. Accordingly, to increase search accuracy, in example embodiments, a step-wise search approach is implemented based on another LSH property. An example the additional steps required to implement a step-wise search approach are illustrated in the process block 1454 ("Step-wise Search of Index Structures with Similar Sub-Index IDs") in FIG. 14 and the step-wise search diagram shown in FIG. 15.

The step-wise search approach is based on the assumption that the sub-index structures that are one step away from each other are most likely to contain compact feature vectors that are close to the compact feature vector of the search query than the sub-indexes that are two steps away. Because there are only two possible values 0/1 in each bit of a compact feature vector, the Hamming distance between two compact feature vectors can be denoted as delta steps, and the maximum number of delta steps is M steps.

In example embodiments, as indicated by process 1452, initially, the sub-index structure 219(SubID) that corresponds to the sub-index ID generated for the compact feature query vector Qk is searched. However, to increase accuracy, the 1-step sub-index structures are also searched, with lost time efficiency increasing with the number of searched sub-indexes. In some example embodiments, the number of 1-step sub-index structures for searching is set at M (i.e. the same number of bits used for the sub-index ID). Using this approach, a higher accuracy may in some cases be achieved by searching within a reasonable number of sub-index structures.

To identify the delta-step sub-index structures for a particular SubID, +1 (for bit=0) or −1 (for bit=1) is applied to the delta number of bits in original sub-index-ID. For example, if the original sub-index-ID of $Q_k$ is SubID=G' $(Q_k)=\{h1(Q_k),h2(Q_k), \ldots , hM(Q_k)\}$, the 1-step sub-index-ID is determined by applying +1/−1 operation on one random bit of G'($Q_k$) the 2-step is applying +1/−1 operation on two random bits of SubID=G' ($Q_k$) and so on. For example, as can be seen from FIG. 15, if M=3, the original sub-index-ID is 010, the 1-step sub-index-IDs are 110, 000, 011, the 2-step sub-index-IDs are 100, 111, 001, the 3-step sub-index-IDs is 101.

Accordingly, in example embodiments, the process block 1454 ("Step-wise Search of Index Structures with Similar Sub-Index IDs") includes determining, as indicated in process block 1456, the sub-index IDs for all of the sub-index structures 219(SubID) that are within a threshold similarity of the "original" or "Step-0" sub-index ID (where the "original" sub-index ID is the SubID of the compact query function vector $Q_k$). In example embodiments, the threshold is the maximum number of steps (e.g. bit changes) within the SubID that fall within a maximum number (e.g. M) of steps. Accordingly, in the example of FIG. 15 where M=3, and the original SubID={0,1,0}, then there will be 3 "1-step" SubIDs that have one bit different than the original SubID, namely: {1,1,0}, {0,0,0}, {0,1,1}, 3 "2-step" SubIDs that have two bits different than the original SubID, namely: {0,0,1}, {1,1,1}, {1,0,0}, and 1 "3-step" SubID that has three bits different than the original SubID, namely: {1,0,1}.

As illustrated in process block 1458, each of the respective sub-index structures 219(SubID) that are identified as falling within the maximum step size are then individually searched to identify any compact vectors K that are similar to the compact query function vector $Q_k$. In example embodiments, such searching is conducted using the search process 230 described above and returns a set of candidate results 232 for each searched sub-index structure 219 (SubID). In example embodiments, the candidate search results may be subjected to filtering and ranking.

In at least some examples, decisions to perform step-wise searching and the extend of such searching may be individually determined by the processing system 1410 for each compact query function vector $Q_k$ based on predetermined search result thresholds. For example, if a threshold number of candidate search results is met after the search of the sub-index structure that corresponds to the original sub-index ID, then additional step-searching (i.e. process block 1454) need not be performed. Similarly, if additional step-searching is performed, the step-searching of additional sub-index structures can be terminated if the threshold number of candidate search results is reached before the maximum number of step searches is completed.

As noted above, in at least some example embodiments, each of the RDF sub-index structures 219(1) to 219($2^M$) is hosted or stored at a different digital processing systems to support concurrent queries. These systems can support concurrent queries based on different object queries, or concurrent step-wise queries based on the same object query.

In at least some example embodiments the methods and systems described above may address some of the time and processing inefficiencies that are inherent in existing large volume unstructured data storage systems, indexing systems, and searching systems, thereby improving one or more of search accuracy, search speed, and use of system resources including processor time and power consumption.

The previous description of some embodiments is provided to enable any person skilled in the art to make or use an apparatus, method, or computer readable medium according to the present disclosure.

Various modifications to the embodiments described herein may be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

For example, although embodiments are described with reference to bits, other embodiments may involve non-binary and/or multi-bit symbols.

The invention claimed is:

1. A method of partitioning a plurality of data objects that are each represented by a respective high dimensional feature vector, comprising:
    performing a locality sensitive hashing function on each high dimensional feature vector to generate a respective lower dimensional binary compact feature vector for the data object that is represented by the high dimensional feature vector;
    performing on each respective lower dimensional binary compact feature vector a further locality sensitive hashing function to generate a sub-index ID for the respective lower dimensional binary compact feature vector and assigning the sub-index ID to the respective lower dimensional binary compact feature vector;
    partitioning the lower dimensional binary compact feature vectors that are assigned identical sub-index IDs into respective partition groups;
    generating a searchable sub-index structure for each respective partition group by:
    generating a plurality of twisted compact feature vector sets for the partition group, each twisted compact feature vector set being generated by applying a respective bit order shuffling permutation to all of the lower dimensional binary compact feature vectors included in the partition group;
    generating a respective index table for each twisted compact feature vector set of the partition group by indexing each of the twisted compact feature vectors included compact feature vector set in the index table based on bit order similarities,
    the searchable sub-index structure for the partition group including the index tables for all of the twisted compact feature vector sets of the partition group, and
    storing the sub-index structures as independently searchable structures.

2. The method of claim 1 wherein each of the locality sensitive hashing function and the further locality sensitive hashing function are orthogonal angle hashing functions.

3. The method of claim 1 wherein
    the respective bit order shuffling permutations are randomly generated.

4. A system for partitioning a plurality of data objects that are each represented by a respective high dimensional feature vector, comprising:
    one or more processing units;
    a system storage device coupled to each of the processing units, the system storage device tangibly storing thereon executable instructions that, when executed by the one or more processing units, cause the system to:
    perform a locality sensitive hashing function on each high dimensional feature vector to generate a respective lower dimensional binary compact feature vector for the data object that is represented by the high dimensional feature vector;
    perform on each respective lower dimensional binary compact feature vector a further locality sensitive hashing function to generate a sub-index ID or the respective lower dimensional binary compact feature vector and assign the sub-index ID to the respective lower dimensional binary compact feature vector;
    partition the lower dimensional binary compact feature vectors that are assigned identical sub-index IDs into respective partition groups;
    generate a searchable sub-index structure for each of the respective partition group by: generating a plurality of twisted compact feature vector sets for the partition group, each twisted compact feature vector set being generated by applying a respective bit order shuffling permutation to all of the lower dimensional binary compact feature vectors included in the partition group;
    generating a respective index table for each twisted compact feature vector set of the partition group by indexing each of the twisted compact feature vectors included compact feature vector set in the index table based on bit order similarities, the searchable sub-index structure for the partition group including the index tables for all of the twisted compact feature vector sets of the partition group, and store the sub-index structures in one or more storages as independently searchable structures.

5. The system of claim 4 wherein each of the locality sensitive hashing function and the further locality sensitive hashing function are orthogonal angle hashing functions.

6. The system of claim 4 wherein the respective bit order shuffling permutations are random.

7. A computer program product comprising a medium tangibly storing thereon executable instructions that, when executed by a digital processing system, cause the digital processing system to:

perform a locality sensitive hashing function on each of a plurality of high dimensional feature vectors to generate a respective lower dimensional binary compact feature vector, the high dimensional feature vectors each representing a respective data object;

perform on each respective lower dimensional binary compact feature vector a further locality sensitive hashing function to generate a sub-index ID for the respective lower dimensional binary compact feature vector and assign the sub-index ID to the respective lower dimensional binary compact feature vector; and partition the lower dimensional binary compact feature vectors that are assigned an identical sub-index ID into a respective partition group;

partition the lower dimensional binary compact feature vectors that are assigned identical sub-index IDs into respective partition groups;

generate a searchable sub-index structure for each of the respective partition group by:

generating a plurality of twisted compact feature vector sets for the partition group, each twisted compact feature vector set being generated by applying a respective bit order shuffling permutation to all of the lower dimensional binary compact feature vectors included in the partition group;

generating a respective index table for each twisted compact feature vector set of the partition group by indexing each of the twisted compact feature vectors included compact feature vector set in the index table based on bit order similarities, the searchable sub-index structure for the partition group including the index tables for all of the twisted compact feature vector sets of the partition group, and store the sub-index structures in one or more storages as independently searchable structures.

8. The method of claim 1 further comprising searching the plurality of data objects for data objects that are similar to a query object, comprising:

converting the query object into a d-dimensional feature vector;

performing a locality sensitive hashing function on the d-dimensional feature vector to generate an m-dimensional binary compact query vector for the query object, where m<d;

performing a further locality sensitive hashing function on the m-dimensional binary compact query vector to determine a sub-index ID for the m-dimensional binary compact query vector; and searching, in the sub-index structure that corresponds to the sub-index ID for the m-dimensional binary compact query vector, for lower dimensional binary compact feature vectors that are similar to the m-dimensional binary compact query vector.

9. The method of claim 8 wherein each of the locality sensitive hashing function and the further locality sensitive hashing function are orthogonal angle hashing functions.

10. The method of claim 8 further comprising:

determining a set of further sub-index IDs that fall within a similarity threshold for the sub-index ID for the m-dimensional binary compact query vector; and searching further sub-index structures that correspond to the further sub-index IDs for compact feature vectors that are similar to the m-dimensional binary compact query vector.

11. The method of claim 10 wherein the similarity threshold is a threshold level of different bit values in the further sub-index IDs relative to the sub-index ID of the m-dimensional binary compact query vector.

12. The method of claim 10 wherein the searching of further sub-index structures is terminated if a threshold number of search results is reached before all of the sub-index structures that correspond to the further sub-index IDs have been searched.

13. The method of claim 8 comprising, concurrent with searching in a sub-index structure that corresponds to the sub-index ID: searching a further sub-index structure for compact feature vectors that are similar to a further query vector for which a further sub-index ID has been determined.

14. The method of claim 1 wherein the respective lower dimensional binary compact feature vector generated in respect of each high dimensional feature vector comprises a number m of binary values, each binary value being a hash function result of all feature values of the high dimensional feature vector with a respective hash function of an LSH hash function chain of m hash functions, the m hash functions of the LSH hash function chain each being randomly selected from a family of greater than m hash functions.

\* \* \* \* \*